United States Patent
Zorzetto et al.

(10) Patent No.: US 11,835,376 B2
(45) Date of Patent: Dec. 5, 2023

(54) CAPACITIVE SENSOR FOR DETECTION OF THE LEVEL OF A MEDIUM

(71) Applicant: ELTEK S.p.A., Casale Monferrato (IT)

(72) Inventors: Mauro Zorzetto, Casale Monferrato (IT); Marco Pizzi, Casale Monferrato (IT); Matteo Rondano, Casale Monferrato (IT); Giorgio Fagnola, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 471 days.

(21) Appl. No.: 17/282,173

(22) PCT Filed: Oct. 3, 2019

(86) PCT No.: PCT/IB2019/058430
§ 371 (c)(1),
(2) Date: Apr. 1, 2021

(87) PCT Pub. No.: WO2020/070689
PCT Pub. Date: Apr. 9, 2020

(65) Prior Publication Data
US 2022/0003589 A1  Jan. 6, 2022

(30) Foreign Application Priority Data
Oct. 3, 2018 (IT) .......................... 102018000009140

(51) Int. Cl.
*G01F 23/26* (2022.01)
*G01F 23/263* (2022.01)

(52) U.S. Cl.
CPC .......... *G01F 23/266* (2013.01); *G01F 23/268* (2013.01)

(58) Field of Classification Search
CPC ...... G01F 23/26; G01F 23/263; G01F 23/266; G01F 23/268
See application file for complete search history.

(56) References Cited

U.S. PATENT DOCUMENTS

2013/0276532 A1  10/2013  Kato
2017/0191861 A1*  7/2017  Rondano ............... G01F 23/263
(Continued)

FOREIGN PATENT DOCUMENTS

DE  10 2014 006695  11/2014
DE  10 2016 123489  6/2018

OTHER PUBLICATIONS

International Search Report and Written Opinion of the ISA for PCT/IB2019/058430, dated Jan. 17, 2020, 13 pages.

*Primary Examiner* — Eric S. McCall
(74) *Attorney, Agent, or Firm* — Nixon & Vanderhye P.C.

(57) ABSTRACT

A capacitive level sensor comprises a control circuit, a supporting structure and a detection structure on the supporting structure. The detection structure comprises a plurality of electrodes, each including a connection part and a plurality of detection parts which extend in a transverse direction relative to a length direction of the sensor, the detection parts of a first electrode being interdigitated with respect to the detection parts of a second electrode. The detection structure includes a plurality of detection sections, which extend in succession in the length direction and include an upper section and one or more underlying lower sections. Each detection section includes respective first and second electrodes, which are electrically insulated from one another and with respect to the first and second electrodes of the other detection sections. The control circuit is prearranged for selectively applying an electrical potential difference between the first and second electrodes of a corresponding detection section, for detecting a value of electrical capacitance therebetween, and deriving therefrom the level of a medium.

20 Claims, 28 Drawing Sheets

(56) References Cited

U.S. PATENT DOCUMENTS

| | | | |
|---|---|---|---|
| 2017/0261361 A1* | 9/2017 | Rondano | G01F 23/265 |
| 2017/0299416 A1* | 10/2017 | Rondano | G01F 23/268 |
| 2018/0177238 A1 | 6/2018 | Bessant et al. | |
| 2021/0333140 A1* | 10/2021 | Cerutti | G01F 23/268 |

* cited by examiner

Fig. 21
Fig. 22
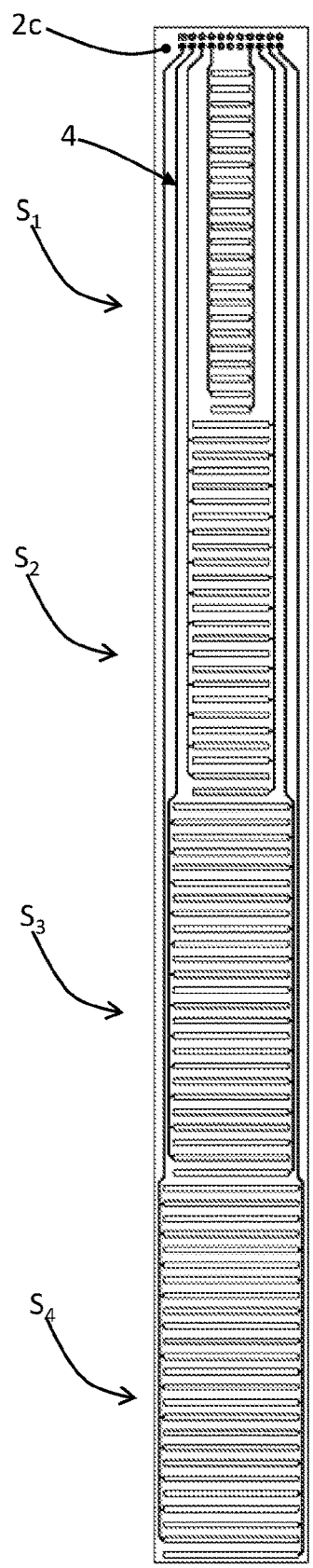
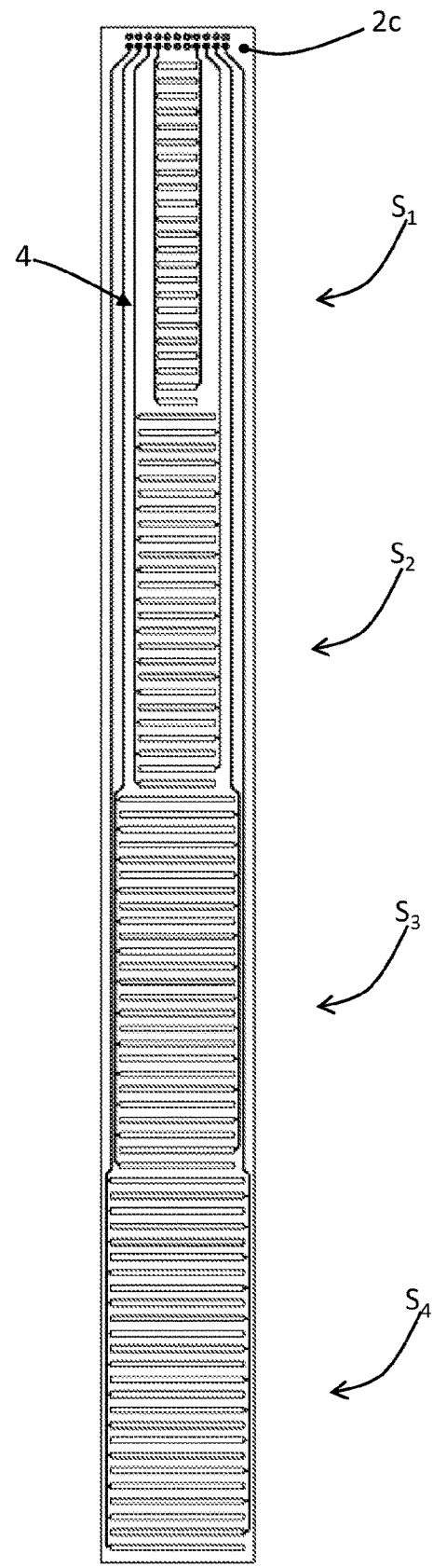

Fig. 42
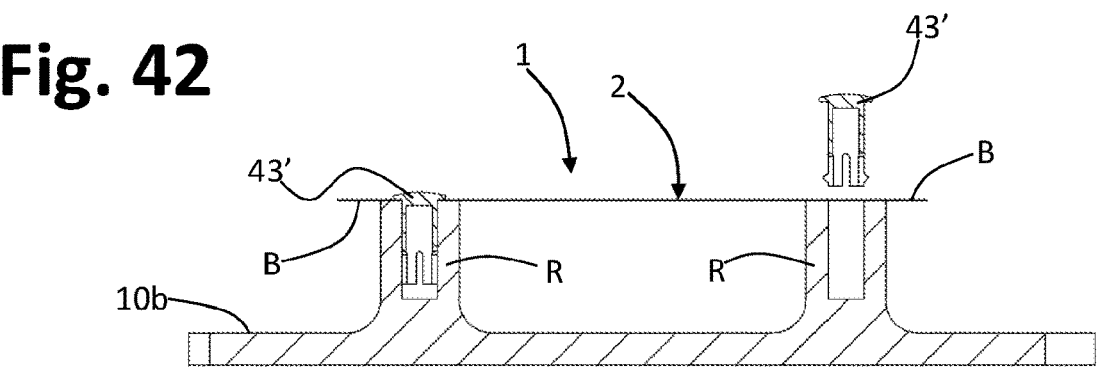
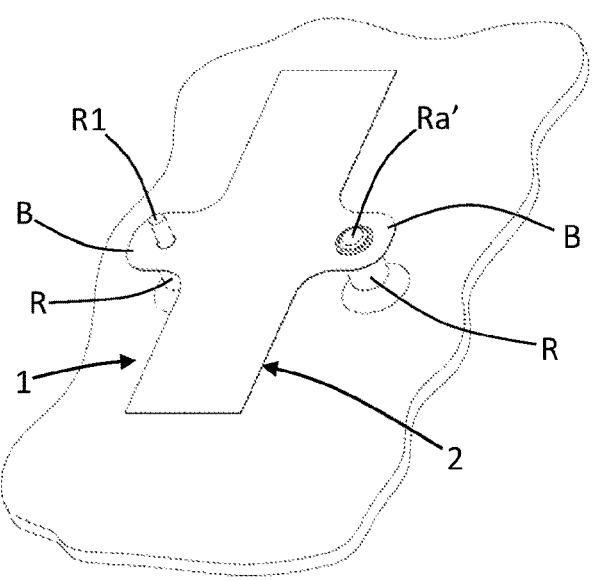
Fig. 43
Fig. 44
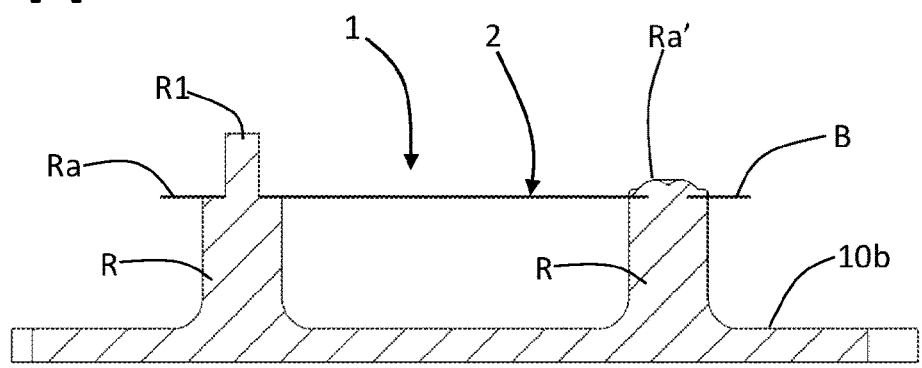

CAPACITIVE SENSOR FOR DETECTION OF THE LEVEL OF A MEDIUM

This application is the U.S. national phase of International Application No. PCT/IB2019/058430 filed 3 Oct. 2019, which designated the U.S. and claims priority to IT Patent Application No. 102018000009140 filed 3 Oct. 2018, the entire contents of each of which are hereby incorporated by reference.

FIELD OF THE INVENTION

The present invention relates to capacitive sensors for detecting the level of a generic medium, such as a liquid, a fluid substance, a powdery material or a material in the bulk state, etc. The invention has been developed with particular reference to sensors that are to be installed or integrated in vehicle tanks, for example fuel tanks or tanks for additives necessary for operation of a motor-vehicle engine.

PRIOR ART

Level sensors are used in various contexts for detecting a residual amount of a liquid present in a generic container, such as a tank.

Some of these sensors are based upon the measurement of electrical quantities, such as capacitance or impedance, or conductivity/resistivity, made using at least two electrodes. In some solutions, the electrodes are directly in contact with the liquid, whereas in other solutions the sensor is provided with a casing for isolating the electrodes from the liquid. The sensors in which the electrodes are in contact with the liquid are subject to ageing and early wear, and their operation is strictly linked to the characteristics of the liquid, such as its conductivity/resistivity or its dielectric constant.

With reference in particular to detections of a capacitive type, a widely adopted solution is to provide an array of planar electrodes, which are arranged in the direction of level detection on a corresponding insulating support, with the latter that is mounted inside the tank. The electrodes are connected individually or in sets to a circuit arrangement, which excites the electrodes themselves via an oscillator circuit. A control unit, by processing the value of capacitance detected between at least two electrodes, is able to identify an area of transition between the liquid and the air in the tank, considered as indicating the level of the liquid.

The ideal approach would be to provide a completely "digital" capacitive sensor, i.e., of the type where each electrode of the array measures a portion of level in a discrete way, in on-off mode, exploiting the difference, which is in any case high, between the permittivity of the air and that of the fluid. Since it is necessary, however, to measure a depth that is frequently in the region of one metre or higher, with a precision of the order of a millimetre, an extremely large number of electrodes would be necessary, of the order of $10^3$, that are to be managed independently. This approach is clearly not convenient either in terms of cost or in terms of encumbrance.

In other capacitive sensors, the measurement is instead carried out by means of just two coplanar electrodes, having respective detection parts—in the form of teeth or fingers—in interdigitated configuration. In these solutions, just two electrical connections are hence sufficient, and the interdigitated detection parts may be in a very high number. These sensors hence make it possible to carry out an "analog" measurement, i.e., a continuous measurement, with high resolution and by means of a relatively simple, inexpensive, and compact structure. Operation of these sensors is, however, affected by possible detection errors, due to electrical disturbance or parasitic capacitances.

Aim and Summary of the Invention

In its general terms, the present invention has the aim of providing a level sensor with high measurement resolution, but which is simple and economically advantageous to produce, which is distinguished by a high flexibility of use, and the detections of which are less affected by electrical noise, such as electrical disturbance, and/or faults of measurement, also due to parasitic capacitances.

The above and other aims still, which will emerge clearly hereinafter, are achieved according to the present invention by a level sensor having the characteristics specified in the annexed claims. The claims form an integral part of the technical teaching provided herein in relation to the invention.

BRIEF DESCRIPTION OF THE DRAWINGS

Further aims, characteristics, and advantages of the present invention will emerge clearly from the ensuing detailed description, with reference to the annexed drawings, which are provided purely by way of non-limiting example and in which:

FIGS. 21 and 22 are schematic views in front elevation of the front and of the back of a level sensor according to possible embodiments of the invention;

FIGS. 32-44 are partial and schematic perspective and cross-sectional views, aimed at exemplifying various possible embodiments of a positioning and/or fixing element that can be used in a level sensor according to possible embodiments of the invention;

DESCRIPTION OF PREFERRED EMBODIMENTS OF THE INVENTION

Figure 1:
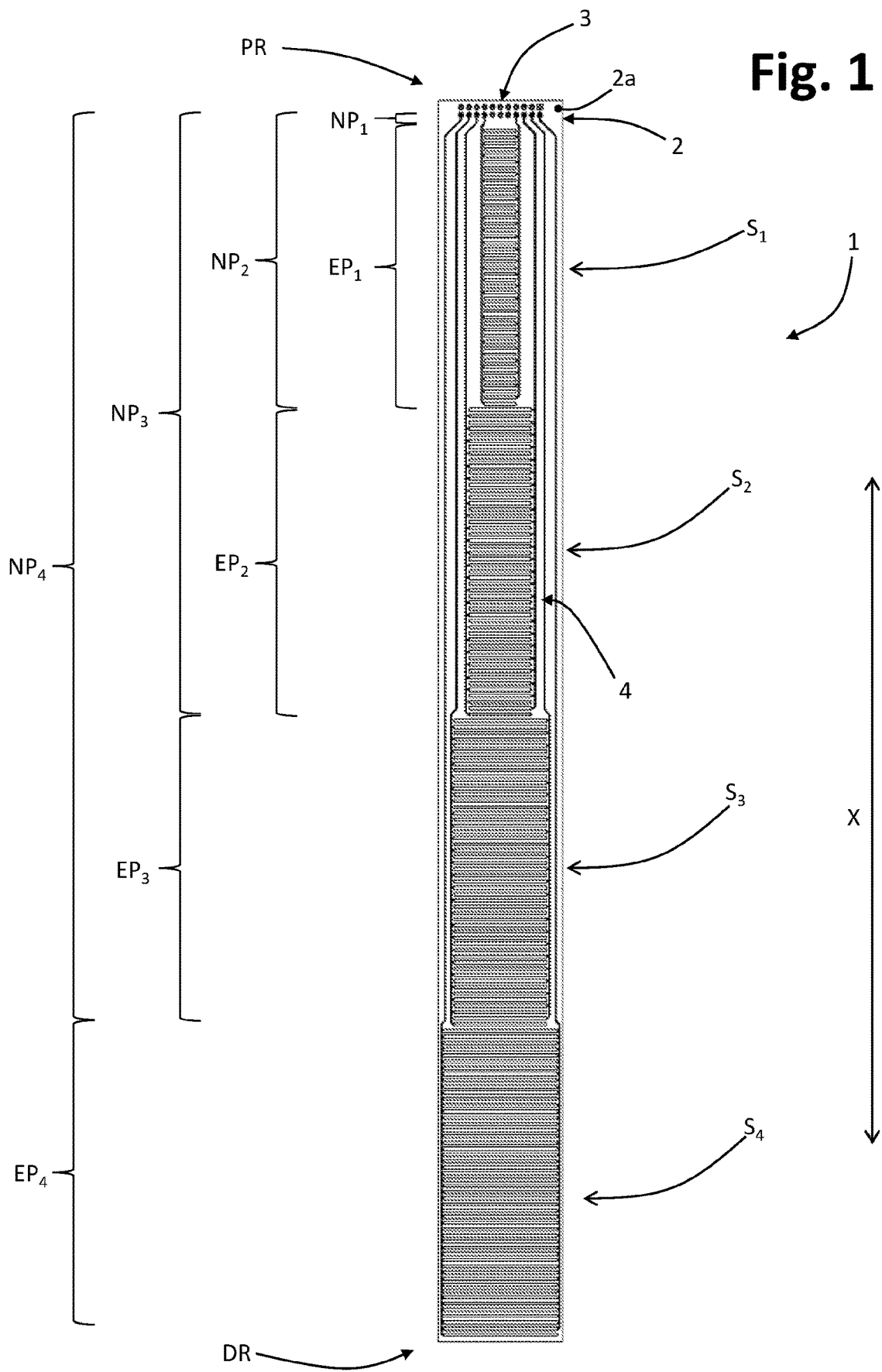
FIG. 1 is a schematic view in front elevation of a level sensor according to possible embodiments of the invention.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in different points of this description do not necessarily refer to one and the same embodiment. Moreover, particular conformations, structures, or characteristics defined in the framework of the present description may be combined in any adequate way in one or more embodiments, even different from the ones represented. The reference numbers and spatial references (such as "upper", "lower", "top", "bottom", etc.) used herein are only provided for convenience and hence do not define the sphere of protection or the scope of the embodiments.

In the present description and in the attached claims, the generic terms "material" and "liquid" are to be understood as including mixtures, compositions, or combinations of a number of different materials, substances, or liquids.

In the present description and in the attached claims, the term "effective", when referring to an axially extended portion of one of the electrodes described hereinafter, is intended to mean that particular portion of electrode departing from which are respective detection parts, which are in a configuration interdigitated (i.e., alternating) with respect to homologous detection parts of another electrode. Conversely, the term "non-effective", when referring to an axially extended portion of one of the aforesaid electrodes, is intended to mean a different portion of the same electrode, without the aforesaid detection part, which extends, for example, between an "effective portion" and an end of the aforesaid electrode designed for its electrical connection to a control circuit.

In the present description and in the attached claims, the term "capacitive" and the like, in particular when linked to sensors or detections described, is intended to include also sensors or measurements of capacitance made between electrodes set side by side (i.e., not necessarily with electrodes facing one another), moreover including sensors or detections of the so-called field-effect type.

In the present description and in the attached claims, the term "medium", when referring to a substance undergoing level sensing and/or qualitative detections, is intended to include a fluid, such as a liquid or a mixture of liquids or other materials and fluid substances different from aeriforms and that are to be stored in containers or tanks.

In the present description and in the attached claims, the term "quality" and the like, when linked to sensors or detections described, is intended to include chemico-physical characteristics of the medium undergoing detection, such as characteristics linked to its composition and/or to its type and/or to its possible dilution, etc.

With initial reference to FIG. 1, designated as a whole by 1 is a level sensor according to possible embodiments, for detecting the level of a generic medium contained in a generic tank: in what follows, it is assumed that the aforesaid medium is a liquid, for example a fuel, and that the aforesaid container is a vehicle tank.

The sensor 1 comprises at least one supporting structure 2, of a generally oblong shape, which extends substantially in a direction of length X and has a proximal end region PR and a distal end region DR. According to the type of installation of the sensor, the direction of length X may substantially correspond to the direction of measurement of the level of the liquid, i.e., it may be substantially vertical. However, the fact that the supporting structure 2 generally extends in a direction of length does not necessarily imply that the structure extends completely in the vertical direction or is completely upright: as will be seen, in fact, in various embodiments the structure 2 may extend inclined in the liquid, or comprise a number of stretches of structure with different inclinations.

In what follows, it is assumed that, in the operative condition of the sensor 1, the distal end region DR is the one that will be closest to a bottom wall of the tank containing the liquid the level of which is to be detected, and that the proximal end region PR is the one that will be closest to the top wall of the tank.

In various preferential embodiments, an electrical-connection structure 3 is provided at the proximal end region PR on the supporting structure 2. On the supporting structure 2 a capacitive detection structure 4 is then present, comprising a plurality of electrodes. The connection structure 3 provides substantially an interface for connection of the sensor 1 to an external system (for example, an on-board control unit of a vehicle), and may possibly form part of an electronic control circuitry of the level sensor 1. The detection structure 4 is, instead, the part of the sensor 1 that is to be at least partially immersed in the liquid undergoing measurement, together with a respective portion of the supporting structure 2. As will emerge clearly hereinafter, the sensor 1 may include even a number of detection structures 4 electrically connected to one and the same connection structure 3.

In various preferential embodiments, the supporting structure 2 is a structure that is substantially flexible or deformable, or in any case adaptable to various shapes. As will be seen, this characteristic is particularly advantageous for facilitating installation of the sensor 1 on tanks or containers having complex geometrical shapes, in which it is not possible or convenient to install a rigid and straight sensor. The flexibility of the structure 2, i.e., of the sensor 1 as a whole, moreover enables adaptation of the configuration of installation according to the type of final application.

In various preferential embodiments, the supporting structure basically consists of at least two layers or sheets of electrically insulating material, one of which is designated by 2a, which are associated to one another, preferably in a fluid-tight way, with the aforesaid electrodes set in between. The two layers 2a are preferably made of a plastic material resistant from the chemical standpoint to the liquid undergoing detection and can be bonded or glued together. Preferred materials for the two layers 2a are, for example, HD-PE, LD-PE, PE, PP, with a PA base. The thickness of the layers 2a may be indicatively comprised between 0.1 and 1.5 mm, preferably between 0.1 and 0.5 mm. The length of the sensor 1, i.e., of its supporting structure 2, may be indicatively comprised between 10 and 200 cm.

The detection structure 4 comprises a plurality of electrodes. Each electrode comprises an elongated connection part, which extends substantially in the direction of length X, starting from the connection structure 3 as far as the distal end region. Each electrode then comprises a plurality of detection parts, for example, in the form of fingers or teeth, in an interdigitated configuration with respect to the homologous detection parts of another electrode.

According to an important aspect, the capacitive detection structure 4 comprises a plurality (n) of detection areas or sections S, which extend in succession in the direction of length X. In the example illustrated in FIG. 1, the detection structure 4 is divided into four detection areas or sections designated by $S_1$, $S_2$, $S_3$ and $S_4$, but in other embodiments the number of these sections may be greater or smaller.

In general, the detection sections S include at least one upper section $S_1$, closer to the proximal end region PR, and one or more underlying sections, amongst which at least one lower section $S_4$, closer to the distal end region DR. In various embodiments, such as the one exemplified, provided between the upper section $S_1$ and the lower section $S_4$ are one or more intermediate sections, such as the sections designated by $S_2$ and $S_3$. In the example, the various sections $S_1$-$S_4$ have different heights (or lengths, in the direction X), but this does not constitute an essential characteristic.

Figure 2A:
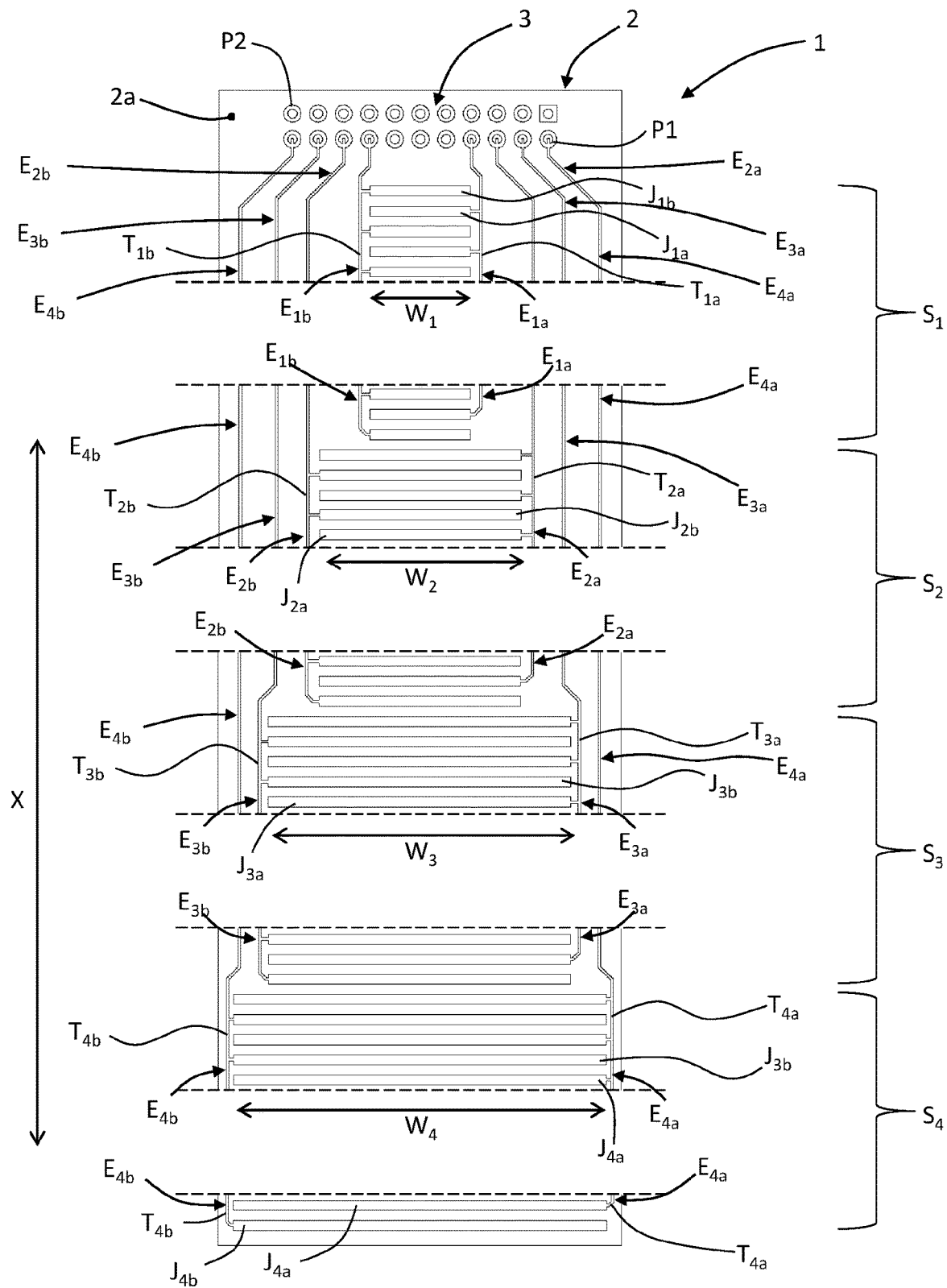
FIGS. 2a and 2b illustrate some details at a larger scale of the sensor of FIG. 1.

According to an important aspect, each detection section $S_1$-$S_4$ includes two measurement electrodes. In FIG. 2a, the two measurement electrodes of each section are designated as a whole by the letter E, followed by the number of the corresponding section (1-4) and by the letter "a" or else "b", to distinguish the two electrodes from one another (a similar notation will be used to designate other elements described hereinafter). Hence, as may be noted, the two electrodes of the sections $S_1$, $S_2$, $S_3$, and $S_4$ are designated by $E_{1a}$-$E_{1b}$, $E_{2a}$-$E_{2b}$, $E_{3a}$-$E_{3b}$, and $E_{4a}$-$E_{4b}$, respectively.

As has been said, each electrode E comprises a respective elongated connection part T, which extends substantially in the direction of length of the detection structure, and a respective plurality of detection parts J at the respective detection section $S_1$-$S_4$. The detection parts J are electrically connected to the corresponding connection part T, thus they are connected in parallel to each other, at an axially extended portion of the latter, referred to herein as "effective portion". The effective portions of the parts T of the electrodes are designated as a whole in FIG. 1 by $EP_1$-$EP_4$ for the electrodes E of the various sections $S_1$-$S_4$. Extending, instead, between each effective portion and the electrical-connection end of the corresponding part T is an axially extended portion, referred to herein as "non-effective portion", which is without any detection parts J. The non-effective portions of the parts T of the electrodes are designated as a whole in FIG. 1 by $NP_1$-$NP_4$ for the electrodes E of the various sections $S_1$-$S_4$.

The detection parts J extend starting from the corresponding effective portion in a direction transverse to the direction of length X, substantially equidistant from one another, and have a respective dimension of width W. The detection parts J have preferably the same height, with reference to the length dimension X. In FIG. 2a, the connection parts of the electrodes $E_{1a}$ and $E_{1b}$ of the section $S_1$ are designated by $T_{1a}$ and $T_{1b}$, respectively, and the corresponding detection parts are designated by $J_{1a}$, $J_{1b}$. Likewise, hence:

for the section $S_2$ the connection parts of the electrodes $E_{2a}$ and $E_{2b}$ are designated by $T_{2a}$ and $T_{2b}$, respectively, and the corresponding detection parts are designated by $J_{2a}$ and $J_{2b}$;

for the section $S_3$ the connection parts of the electrodes $E_{3a}$ and $E_{3b}$ are designated by $T_{3a}$ and $T_{3b}$, respectively, and the corresponding detection parts are designated by $J_{3a}$ and $J_{3b}$; and for the section $S_4$ the connection parts of the electrodes $E_{4a}$ and $E_{4b}$ are designated by $T_{4a}$ and $T_{4b}$, respectively, and the corresponding detection parts are designated by $J_{4a}$ and $J_{4b}$.

Once again in FIG. 2a it may be noted how, at each detection section $S_1$-$S_4$, the detection parts J of one electrode $E_{(n)a}$ are arranged in interdigitated configuration with respect to the detection parts J of the other electrode $E_{(a)b}$.

The electrodes E are made of an electrically conductive material, for example a metal material or a conductive ink, which can be applied directly on one of the two layers or sheets 2a that provide the supporting structure 2, and then covered and sealed with the other layer or sheet 2a. The electrically conductive material may be applied according to any technique in itself known, for example via a serigraphic deposition process. Also the electrical-connection structure 3 may be obtained at least in part via deposition of material. In various embodiments, such as the one so far exemplified, the structure comprises two series of connection pads P1 and P2, for example connected together in pairs in the direction X, there departing from the pads P1 the connection parts T of the electrodes E, and the pads P2 being instead designed for connection with power-supply and/or control leads not represented, forming part of a control circuit of the sensor 1.

Production of the sensor 1 is hence extremely simplified and inexpensive. In alternative embodiments, it is also possible to provide the structure 2 with a specific flexible support on which the electrodes E are deposited, with the flexible support that is then enclosed in a fluid-tight way between the layers or sheets 2a, or in a protective housing of some other type.

As has been said, in the case exemplified in FIGS. 1 and 2a, the detection structure 4 includes four sections S, and hence eight measurement electrodes E, but in other embodiments one or more detection sections S may include at least one further electrode, in particular a reference electrode, as described hereinafter.

The two electrodes E of each detection section S are electrically insulated from one another and the control circuit of the sensor is configured in such a way that the detection sections S can carry out measurements of capacitance (or electrical field) in a way independent of one another, with the advantages in terms of reduction of electrical noise and parasitic capacitances explained hereinafter.

According to a particularly advantageous preferential characteristic, the detection parts J of the electrodes E of one detection section S have a dimension of width W different from that of an adjacent detection section S.

In various preferential embodiments, they have scaling dimensions of width W, i.e., the dimension W of the detection parts J of the electrodes E of the upper section ($S_1$) is smaller than the dimension of width W of the detection parts of the electrodes E of each underlying section ($S_2$, $S_3$, $S_4$), or equivalently the dimension of width W of the detection parts J of the electrodes E of the lower section ($S_4$) is greater than the dimension of width W of the detection parts of the electrodes E of each overlying section ($S_3$, $S_2$, $S_1$). It should be noted that the sensor 1 may be mounted in a configuration turned upside down with respect to the one exemplified in the figures, i.e., with the section $S_1$ at the bottom and the section $S_4$ at the top, in which case the dimensions of width W will be scaled in a way opposite to the one exemplified. As will be seen, also the preferential characteristic of having detection elements J of different widths W in different sections S can contribute to reducing further electrical noise and parasitic capacitances.

With reference once again to FIG. 2a, it will hence be appreciated that the width $W_1$ of the detection parts $J_{1a}$, $J_{1b}$ at the upper section $S_1$ is smaller than the width $W_2$ of the detection parts $J_{2a}$, $J_{2b}$ at the section $S_2$, and this width $W_2$ is in turn smaller than the width $W_3$ of the detection parts $J_{3a}$, $J_{2b}$ at the section $S_3$; likewise, the width $W_3$ is smaller than the width $W_4$ of the detection parts $J_{4a}$, $J_{4b}$ at the lower section $S_4$.

As has been said, and as may be appreciated from FIG. 2a, the elongated connection parts T of the various electrodes E depart from the connection structure 3 so that they have different lengths in the direction X, which vary between a minimum, for the upper section $S_1$, and a maximum, for the lower section $S_4$. The connection parts T of the various electrodes E extend on the supporting structure 2 in positions generally alongside one another in the direction of length X, on one and the same surface of the supporting structure 2, here the surface of one of the layers or sheets 2a. Consequently, also the non-effective portions $NP_1$-$NP_4$ (FIG. 1) of the connection parts T corresponding to the various sections $S_1$-$S_4$ will have different lengths, here minimum for the electrodes E of the upper section $S_1$, and maximum for the electrodes E of the lower section $S_4$.

It will hence be appreciated that the connection part T of each electrode E of each section has its effective portion EP, extending from which is the respective detection part J, which is in a position generally set alongside at least one stretch of the non-effective portion NP of the connection part T of at least one different electrode E belonging to a different detection section.

Figure 2B:
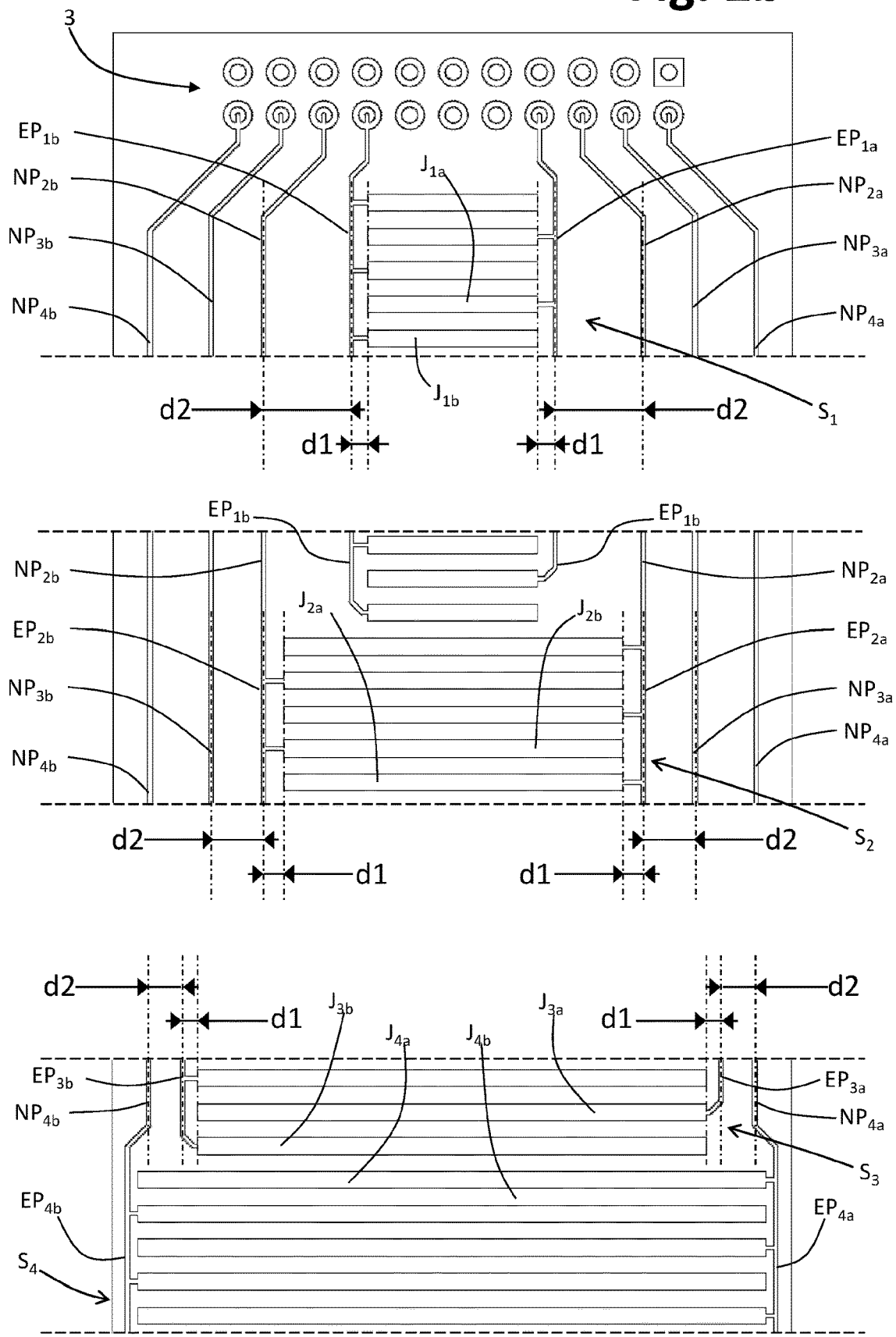

Hence, with reference to the case so far exemplified, at least the portion EP of the part T of an electrode E of each of the sections $S_1$, $S_2$, and $S_3$ is generally also set alongside at least one stretch of the portion NP of the part T of an electrode E belonging to an underlying detection section $S_2$, $S_3$, $S_4$. With reference in particular to FIG. 2b, it should be noted how, at the section $S_1$, the corresponding effective portions $EP_{1a}$ and $EP_{1b}$ extend each alongside corresponding axial portions of the non-effective portions $NP_{2a}$, $NP_{3a}$, $NP_{4a}$ and $NP_{2b}$, $NP_{3b}$, $NP_{4b}$, respectively. Likewise, at the section $S_2$, the corresponding effective portions $EP_{2a}$ and $EP_{2b}$ each extend alongside the non-effective portions $NP_{3a}$, $NP_{4a}$ and $NP_{3b}$, $NP_{4b}$, respectively. Once again in the same way, at the section $S_3$, the effective portions $EP_{3a}$ and $EP_{3b}$ extend alongside the non-effective portions $NP_{4a}$ and $NP_{4b}$, respectively.

According to a preferential aspect, and as may be seen in FIG. 2b, for each measurement electrode E of each detection section S, the distance d1 between each detection part J of one of the two electrodes E and the effective portion EP of the corresponding connection part T of the other of the two electrodes E is smaller than the distance d2 between the above effective portion EP and a non-effective portion NP set alongside it of the connection part T of a different electrode E of a different detection section S. Also this preferential characteristic is useful to reduce further electrical noise and parasitic capacitances.

In FIG. 2b, the aforesaid distances d1 and d2 are highlighted for both of the electrodes $E_{(n)a}$, $E_{(n)b}$ of each of the sections $S_1$, $S_2$, and $S_3$. In the specific example illustrated, the two distances d1 corresponding to the two measurement electrodes E of one and the same section S are substantially the same, but this does not constitute an essential characteristic, as clarified hereinafter. According to various embodiments, in any case, it is preferable for the sum of the two distances d1 of each section S to be smaller than each of the two individual distances d2 of the same section.

As mentioned previously, according to an important aspect, the detection structure 3 is divided into a plurality of different areas or sections $S_1$-$S_4$ that are able to carry out detections of capacitance in a way independent of one another, and hence with an approach of a substantially "digital" type. At the same time, the two electrodes E of each section S are used, in isolation from one another, to make a measurement of a substantially "analog" type, exploiting the interdigitated detection parts J, which make it possible to have available a high measurement resolution, for example of 1 mm over 100 mm of height (length) of the electrode.

A typical limitation of level sensors of a capacitive type, the detection structure of which is constituted by two just electrodes with interdigitated detection parts (for example two combfingered electrodes), i.e., sensors of a basically "analog" type, is given by the signal-to-noise (S/N) ratio, in particular when low levels of liquid are to be measured, i.e., levels such that only a modest portion of the sensor is immersed.

In this regard, it should in general be considered that, when electrodes set side by side are only partially immersed in a liquid, the electrical capacitance of the (overlying) stretches of electrode in air (i.e., not immersed in the liquid) gives rise to an electrical noise or to a parasitic capacitance, which vitiates to a certain extent the measurement as compared to the capacitance of the aforesaid immersed stretches. This noise or parasitic capacitance has a marked effect precisely when the level of the liquid is low, i.e., when the capacitance effectively detected $C_{liquid\ eff}$ between the stretches of the electrodes immersed in the liquid is considerably lower than the capacitance $C_{air\ eff}$ of their stretches in air, i.e., the stretches not immersed in the liquid.

The electrical noise may be in this case identified in $C_{air\ eff}$. The measurement value $C_{delta}=C_{liquid\ eff}-C_{air\ eff}$, and hence the S/N ratio, which is given by $C_{delta}/C_{air\ eff}$, may in fact be heavily attenuated by the magnitude of the value of capacitance $C_{air\ eff}$ in a known sensor of the type mentioned previously.

The solution according to the invention, of dividing the detection structure of the sensor into a plurality "n" of sections, basically makes it possible to reduce the noise by a factor of "n".

Figure 3:
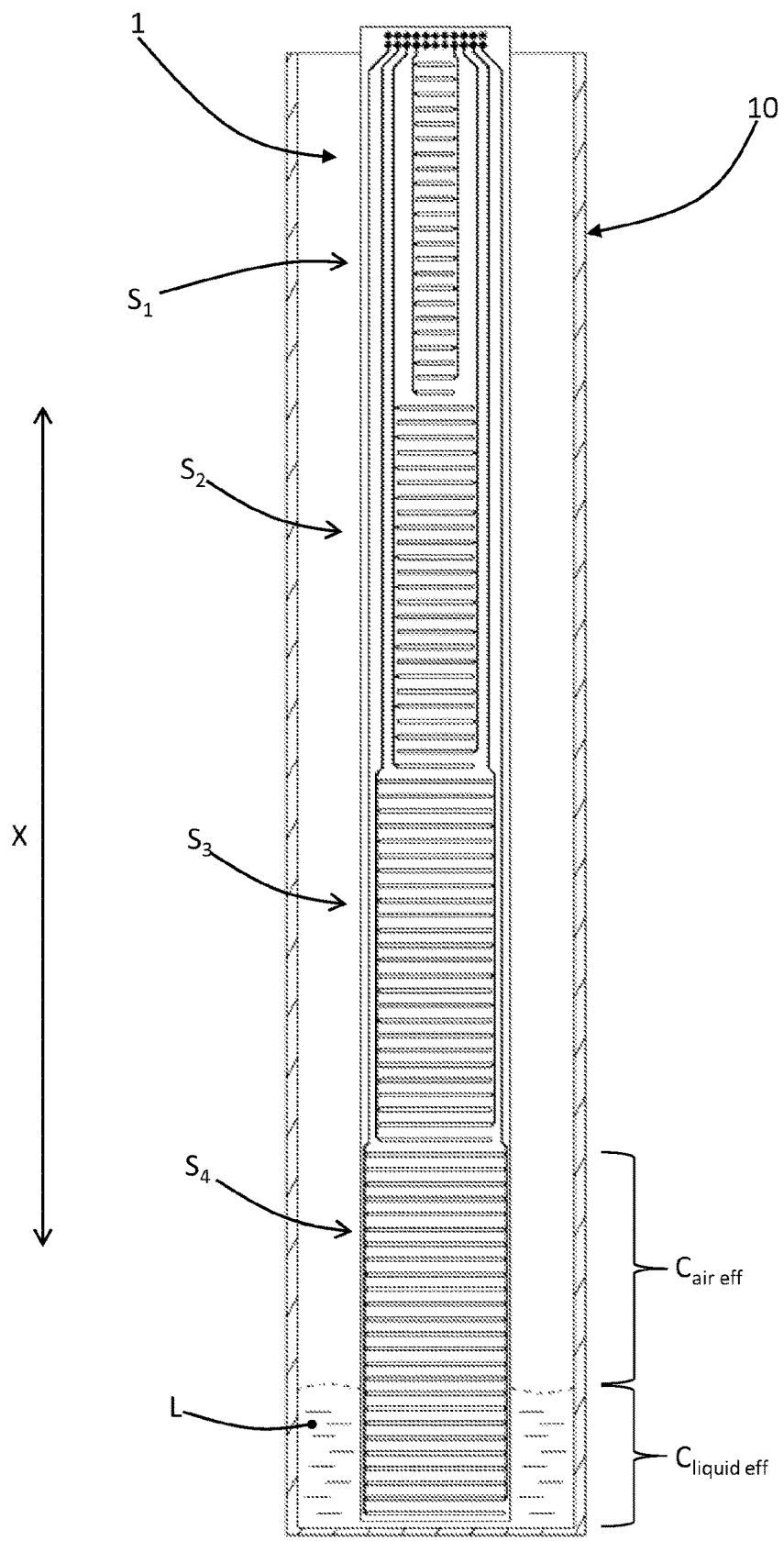
FIGS. 3-5 are schematic representations aimed at exemplifying operation of a level sensor according to possible embodiments of the invention, in three different conditions.

Reference may, for example, be made to FIG. 3, where designated by 10 is a generic container, for example a tank, containing a generic liquid L. In the case exemplified, only a modest fraction of the effective portions of the measurement electrodes belonging to the detection section $S_4$ is immersed in the liquid L. As has been said, level detection is carried out for each individual section $S_1$-$S_4$ independently of the others, in the sense that an electrical potential difference, preferably frequency-modulated, will be applied each time between the two electrodes of a detection section S, with all the other electrodes of the other sections S preferably connected to ground, or else electrically insulated with respect to the measurement electrodes between which the difference of potential is applied. It will hence be appreciated that, in the case exemplified in FIG. 3, in conditions of constant application of the difference of potential between the two measurement electrodes of the section $S_4$, all the other measurement electrodes of the sections $S_1$-$S_3$ will not give substantially rise to any contribution to $C_{air\ eff}$. The value of $C_{air\ eff}$ will, instead, be substantially determined by just the non-immersed part of the measurement electrodes of the detection section $S_4$ here considered.

As may be appreciated, according to the invention, the S/N ratio, understood as $C_{delta}/C_{air\ eff}$, is clearly higher than in the known solution mentioned distinguished by a detection structure formed by two just interdigitated electrodes, which extend throughout the detection height.

Figure 4:
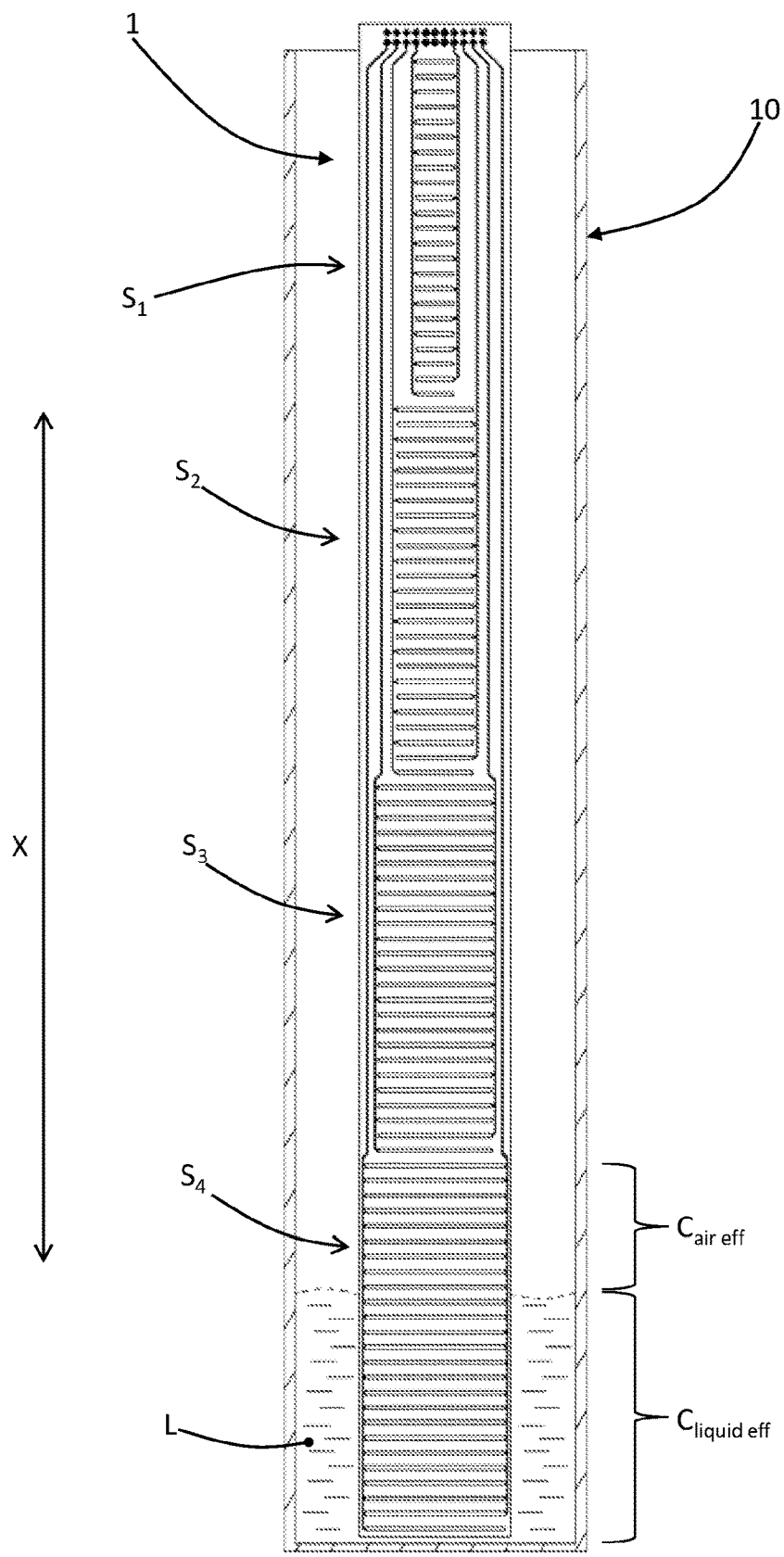
Figure 5:
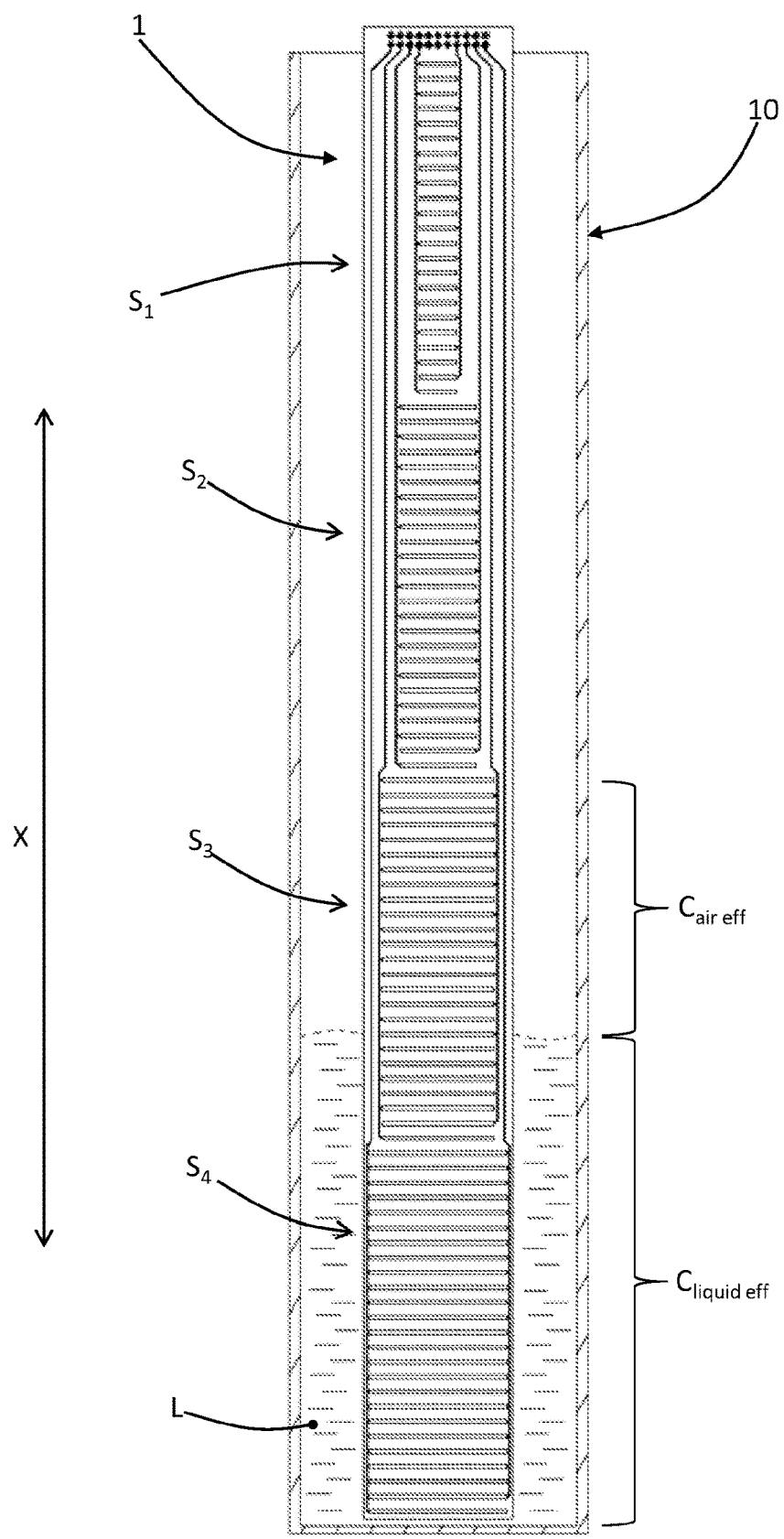

Also FIG. 4 illustrates the case in which the liquid L is at the level of the section $S_4$, but with the effective portions of the corresponding electrodes that are immersed to a prevalent extent (more than half) in the liquid L. FIG. 5 represents, instead, the case where the liquid L is at the level of the section $S_3$: on the basis of what has already been described above, it will hence be appreciated that the value of $C_{air\ eff}$ is substantially determined by just the stretches in air of the measurement electrodes of the section $S_3$, whereas the value of $C_{liquid\ eff}$ is given by the sum of the capacitance detected between the measurement electrodes of the section $S_4$ (the effective part of which is completely immersed in the liquid) and the capacitance detected between the stretches of the effective portions of the electrodes of the section $S_3$ that are immersed in the liquid.

Hence, as may be seen, an advantage of having a capacitive sensor the detection structure of which is divided into areas or sections, each having two independent and interdigitated measurement electrodes, lies in the fact that the sensor has a better S/N ratio as compared to a sensor of a known type.

As mentioned previously, according to a preferential aspect, the detection parts J of the electrodes E of a detection section S have a dimension of width W different from that of an adjacent detection section. As has been said, it is preferable to have scaling configurations of width W, i.e., with reference to the case exemplified so far, with a width W that decreases from the lower detection section $S_4$ to the upper detection section $S_1$, i.e., $W_1 < W_2$, $W_2 < W_3$, $W_3 < W_4$ or, in general $W_{(n)} < W_{(n)-1}$.

For this purpose, it should be considered that the parasitic capacitance also depends upon the distance d2 (FIG. 2b) between the effective portion EP of one electrode E and the non-effective portion NP set alongside of one or more different electrodes. In particular, the greater the distance d2, the lower the parasitic capacitance, and this is particularly true when one measurement electrode E of the section S considered is connected to one electrical potential, whereas the other electrode E of the same section S, and all the other electrodes E of the other sections S, are connected to the opposite electrical potential. The solution proposed makes it possible to have a distance d2 sufficiently large as not to introduce significant contributions to the capacitance in air and hence not to reduce the S/N ratio. In various preferential embodiments, the distance d2 is at least 1 mm.

With reference, for example, to FIG. 2b, assume that the electrical potential difference is applied to the section $S_3$, for example with the left-hand electrode $E_{3b}$ (FIG. 2a) of this section connected to the positive potential and with the right-hand electrode $E_{3a}$ (FIG. 2a) of the same section, as well as the measurement electrodes of all the other sections $S_1$, $S_2$, $S_4$, connected to the negative potential. The effective portion $EP_{3b}$ of the electrode $E_{3b}$ will hence be at the positive potential, together with the corresponding non-effective portion $NP_{3b}$, whereas the effective and non-effective portions of all the other electrodes will be at the negative potential. As may be understood, at the section $S_3$, alongside the effective portion $EP_{3b}$, at the positive potential, there will be the non-effective portion $NP_{4b}$, at the negative potential; in the section $S_2$, the non-effective portion $NP_{3b}$, at the positive potential, will be set between the effective portion $EP_{2b}$ and the non-effective portion $NP_{4b}$, both at the negative potential.

The fact that these stretches of electrode set at different potentials are set alongside one another could provide a contribution to the electrical capacitance in air, and thus worsen the S/N ratio, in the case where the aforesaid stretches of electrode were too close to one another. The solution proposed of having scaling widths W of the detection parts J affords larger space for passage of the non-effective portions NP of the electrodes E, with the possibility of increasing the distance d2.

It should be noted that, in abstract terms, the detection parts J of the various sections S could even have all the same width W and, in order to have available distances d2 that are sufficiently large as to reduce the parasitic capacitances, the surface of the supporting structure 2 could be increased in the direction of width: however, this might not be convenient from the standpoint of overall dimensions, costs, and production processes.

Figure 6:
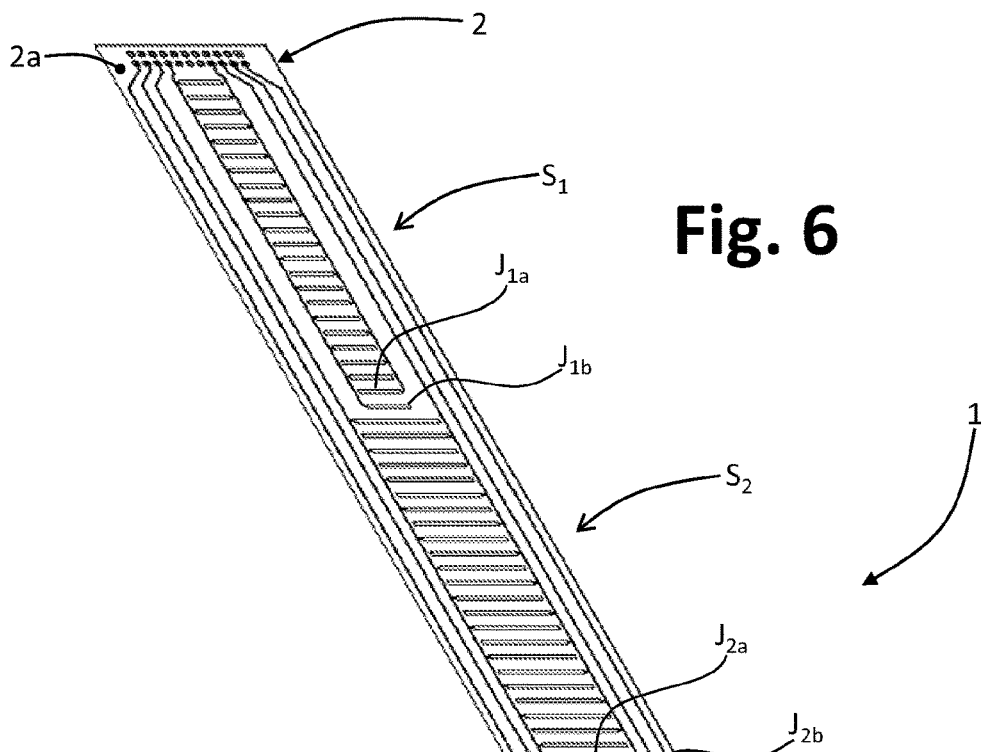
FIG. 6 is a schematic perspective view of a level sensor according to possible embodiments of the invention.
Figure 7:
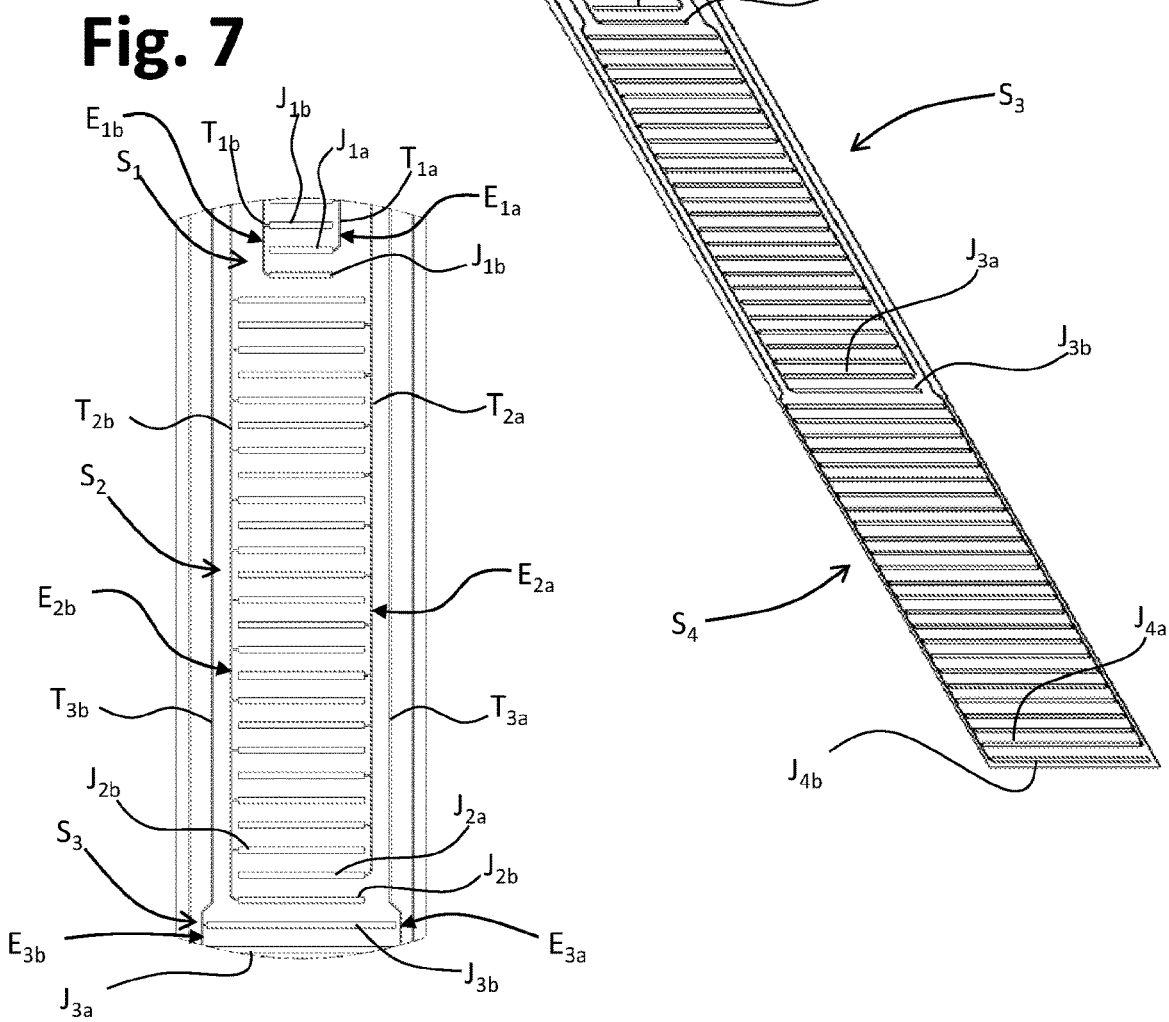
FIG. 7 is a detailed front view of a portion of the sensor of FIG. 6.

In FIG. 6, the sensor 1 of FIGS. 3-5 is represented in perspective view, and in FIG. 7 a corresponding detail thereof is represented, with the right-hand and left-hand electrodes E distinguished by the letters "b" and "a", respectively.

Figure 8:
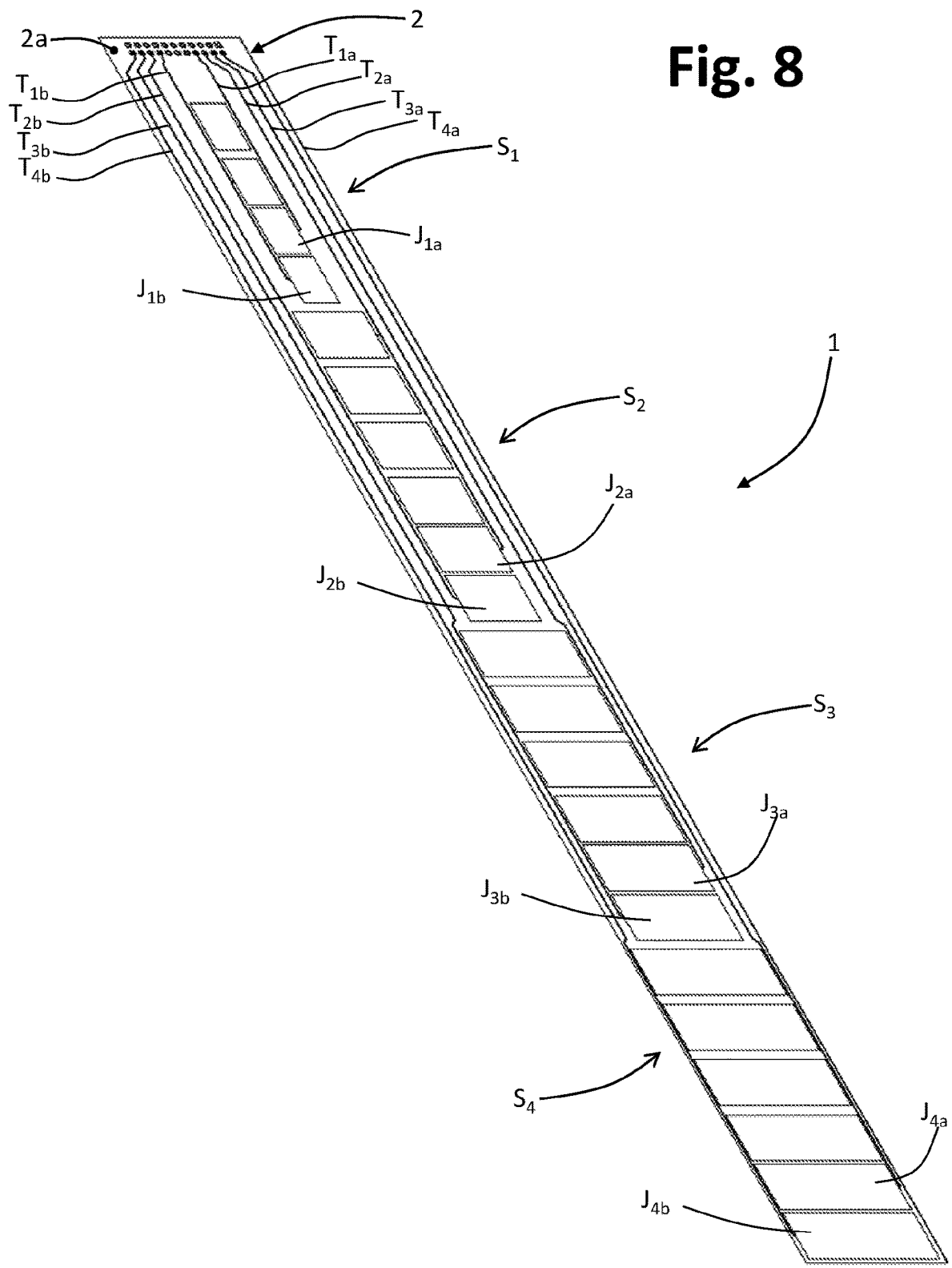
FIG. 8 is a schematic perspective view of a level sensor according to further possible embodiments of the invention.

FIG. 8 illustrates a further example of sensor 1 according to the invention, distinguished by a different shape of the detection parts J. In the versions so far illustrated, the detection parts J are substantially in the form of teeth or fingers, i.e., of electrodes relatively reduced in height in the direction X, whereas in the case of FIG. 8 the detection parts J are in the form of small plates, i.e., of electrodes with a greater height in the direction X, each having a surface area decidedly larger than that of the individual teeth or fingers of the previous embodiments, also in this case the parts J being in interdigitated or alternating configuration. Solutions of this type can be adopted for level detections that do not require a high resolution of measurement.

Figure 9:
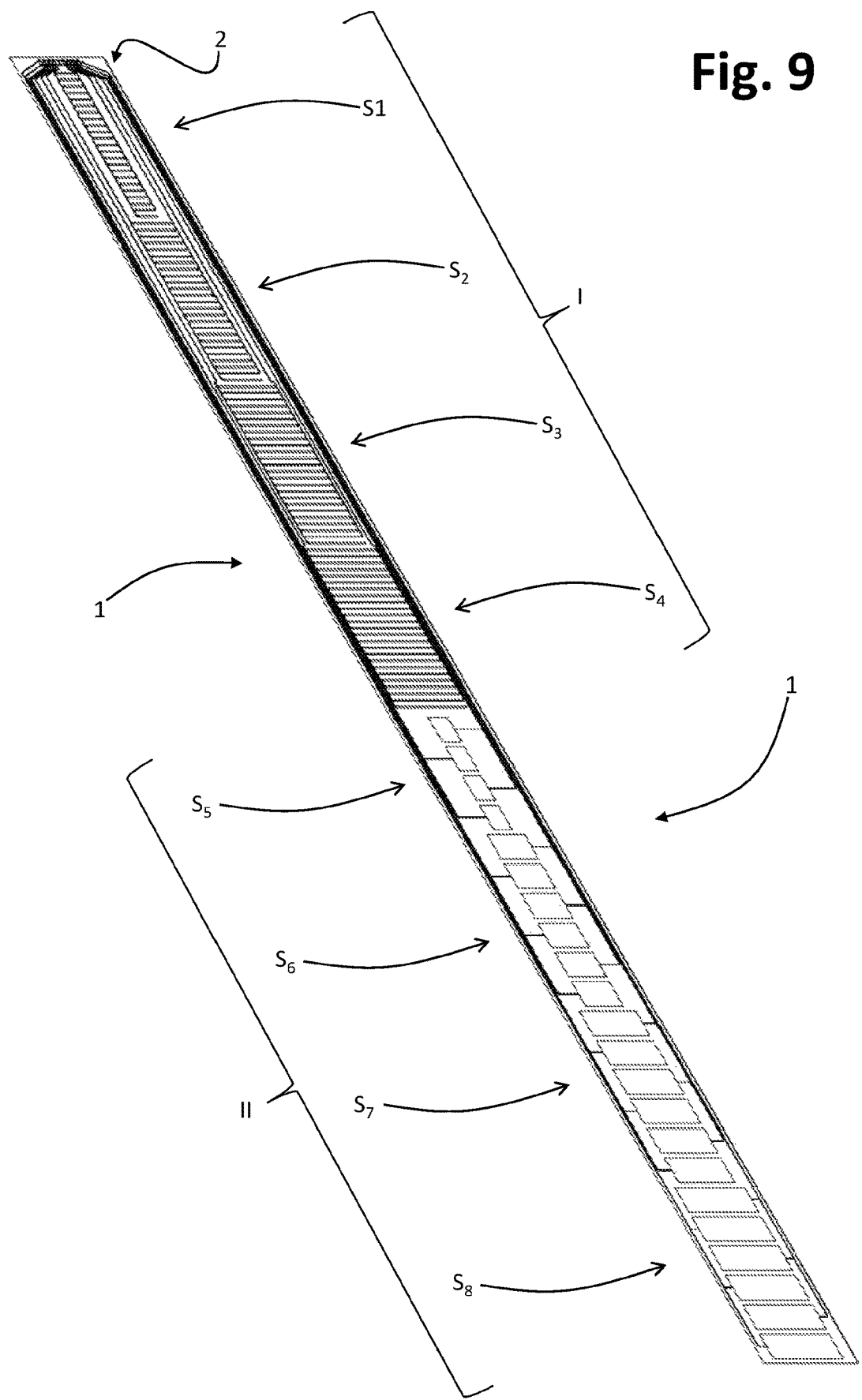
FIG. 9 is a schematic perspective view of a level sensor according to further possible embodiments of the invention.

FIG. 9 illustrates the case of a sensor 1 the detection structure of which includes two different series of detection sections, i.e., a first succession or series I of first sections $S_1$-$S_4$ followed by a second succession or series II of further sections $S_5$-$S_8$. In the specific example illustrated, the sections of each individual series I or II have a configuration with scaling widths W of the detection parts J of the respective electrodes, with the sections $S_1$ and $S_5$ the detection parts J of which are those with the smallest width in the respective series of sections. Once again with reference to the non-limiting example shown, in which the two series I and II may be located on one and the same supporting structure 2, the sections $S_1$-$S_4$ are made substantially according to what is described with reference to FIGS. 1-7, whereas the sections $S_5$-$S_8$ are made substantially according to what is described with reference to FIG. 8.

An embodiment of the type shown in FIG. 9 is, for example, useful when the resolution of the measurement of level in a lower area of a generic container may be different from the measurement resolution required for the upper part of the container itself and/or in the case of a different arrangement or angle of the series I with respect to the series II, such as a vertical arrangement of the series I and an inclined arrangement of the series II.

Figure 10:
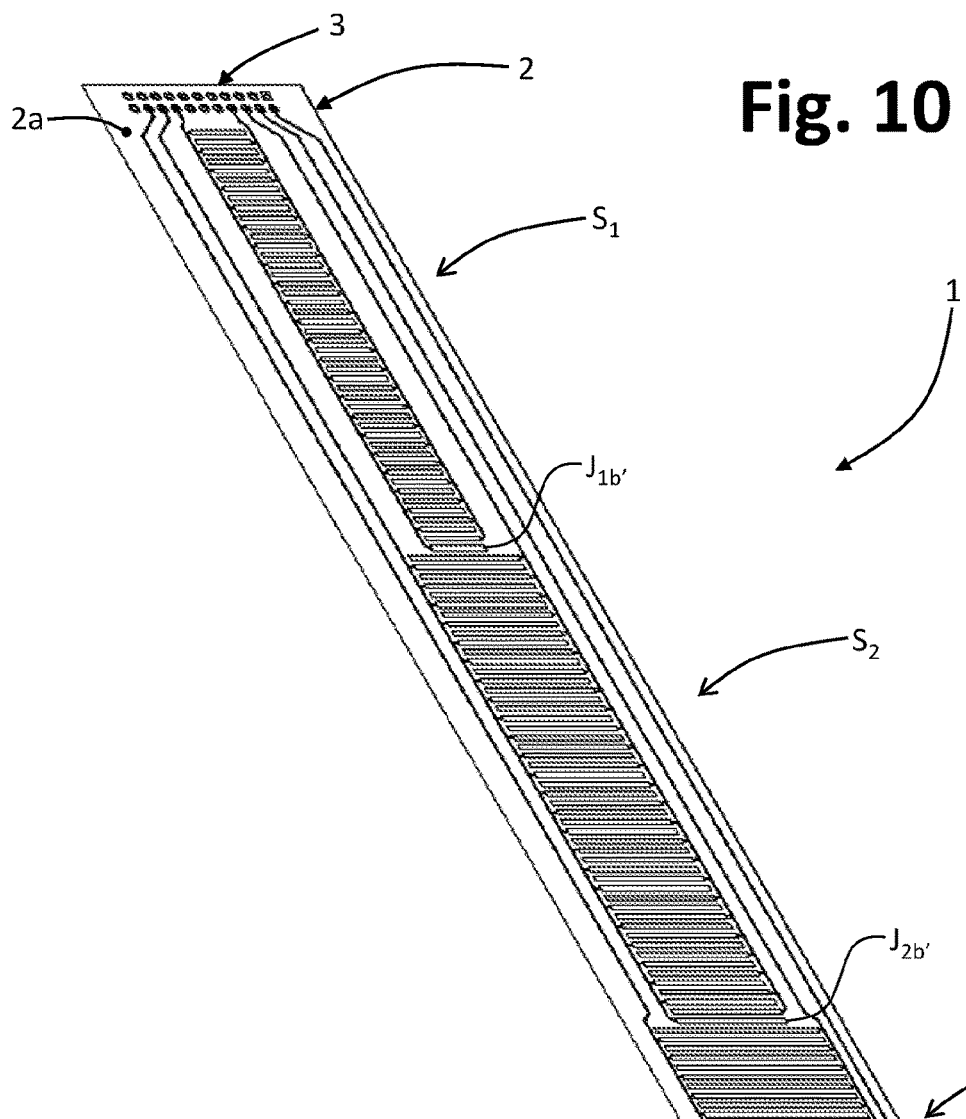
FIG. 10 is a schematic perspective view of a level sensor according to further possible embodiments of the invention.
Figure 11:
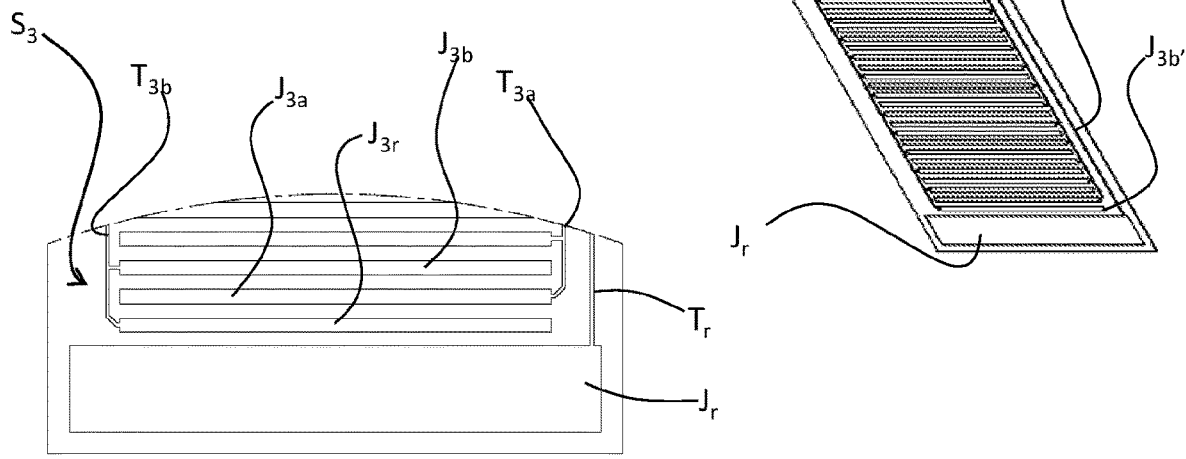
FIG. 11 is a detailed front view of a portion of the sensor of FIG. 11.

FIGS. 10-11 illustrates the case of a sensor 1 the detection structure of which, here divided into just three sections $S_1$-$S_3$, includes a specific reference electrode $J_r$ at its bottom part, i.e., underneath the section $S_3$. The reference electrode $J_r$ is connected to the connection structure 3 via a respective track made of electrically conductive material $T_r$. The electrode $J_r$ and the corresponding track $T_r$ may be obtained as the other electrodes of the sensor 1, for example via deposition of electrically conductive material on one of the two layers or sheets 2a of the supporting structure 2. In the example, the electrode $J_r$ has a surface area decidedly larger than that of the detection parts J of the various measurement electrodes.

Figure 12:
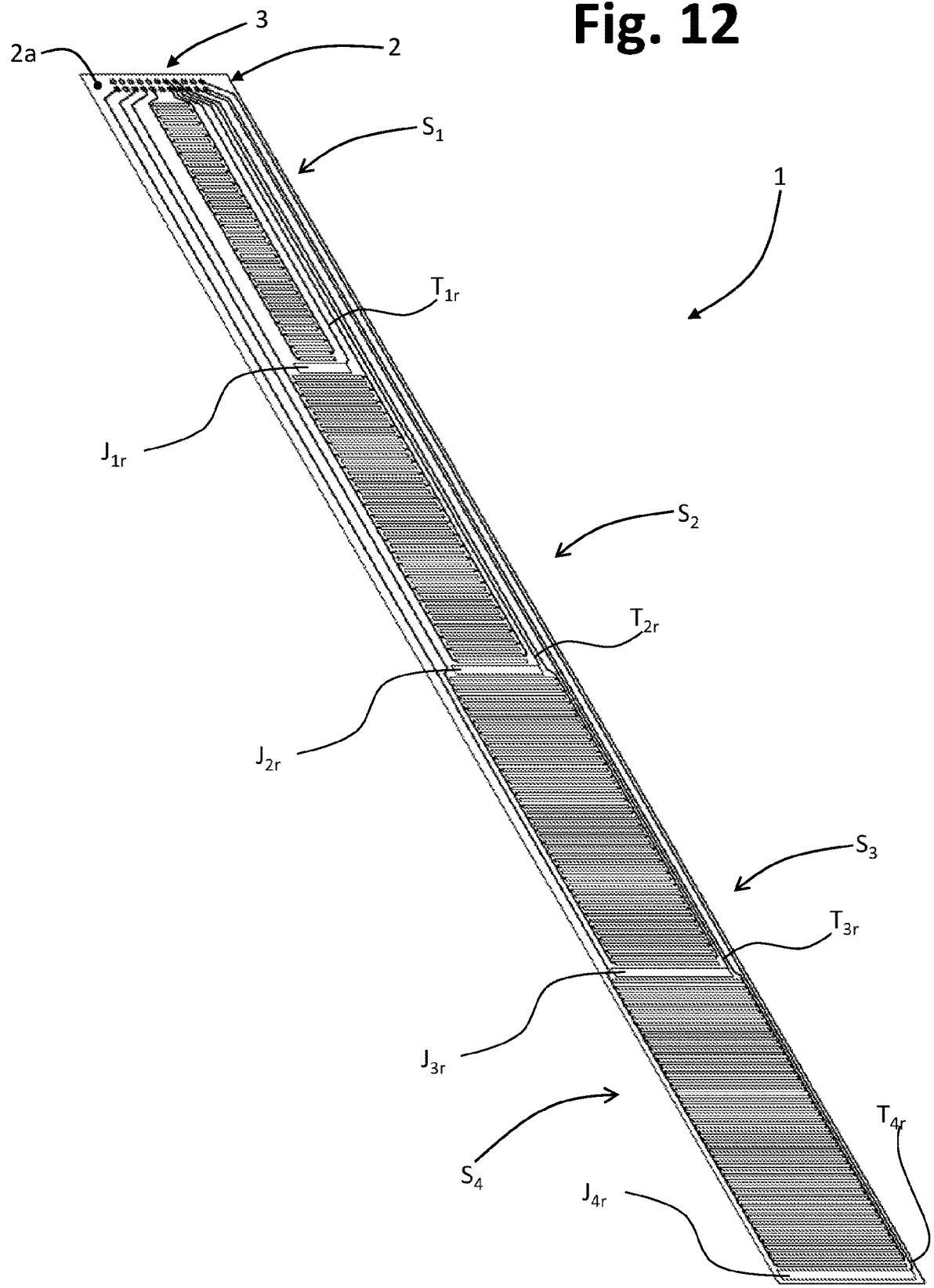
FIG. 12 is a schematic perspective view of a level sensor according to further possible embodiments of the invention.

FIG. 12 illustrates, instead, the case of a sensor 1 the detection structure of which, here exemplified as being divided into four sections $S_1$-$S_4$, includes a specific reference electrode $J_{1r}$, $J_{2r}$, $J_{3r}$, $J_{4r}$ at the bottom part of each detection section $S_1$, $S_2$, $S_3$, $S_4$, respectively. The reference electrodes $J_{1r}$, $J_{2r}$, $J_{3r}$, $J_{4r}$ are connected to respective pads of the connection structure 3 via respective tracks made of electrically conductive material $T_{1r}$, $T_{2r}$, $T_{3r}$, $T_{4r}$. Also the reference electrodes $J_{1r}$, $J_{2r}$, $J_{3r}$, $J_{4r}$ and the corresponding tracks $T_{1r}$, $T_{2r}$, $T_{3r}$, $T_{4r}$ may be obtained as the electrodes E of the sensor 1, for example via deposition of electrically conductive material on one of the two layers or sheets 2a of the supporting structure 2. Also in this case, the electrodes $J_{1r}$, $J_{2r}$, $J_{3r}$, $J_{4r}$ each have a respective surface area larger than that of the detection parts J of the corresponding measurement electrodes E.

In various embodiments, the sensor 1 may be provided with at least one temperature-sensor element TS. In preferential embodiments of this type, a temperature-sensor element may be provided at the lower part of each detection section of the detection structure.

Figure 13:
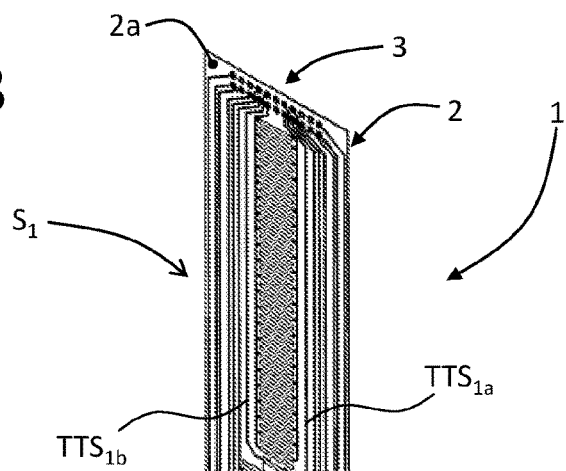
FIG. 13 is a schematic perspective view of a level sensor according to further possible embodiments of the invention.
Figure 14:
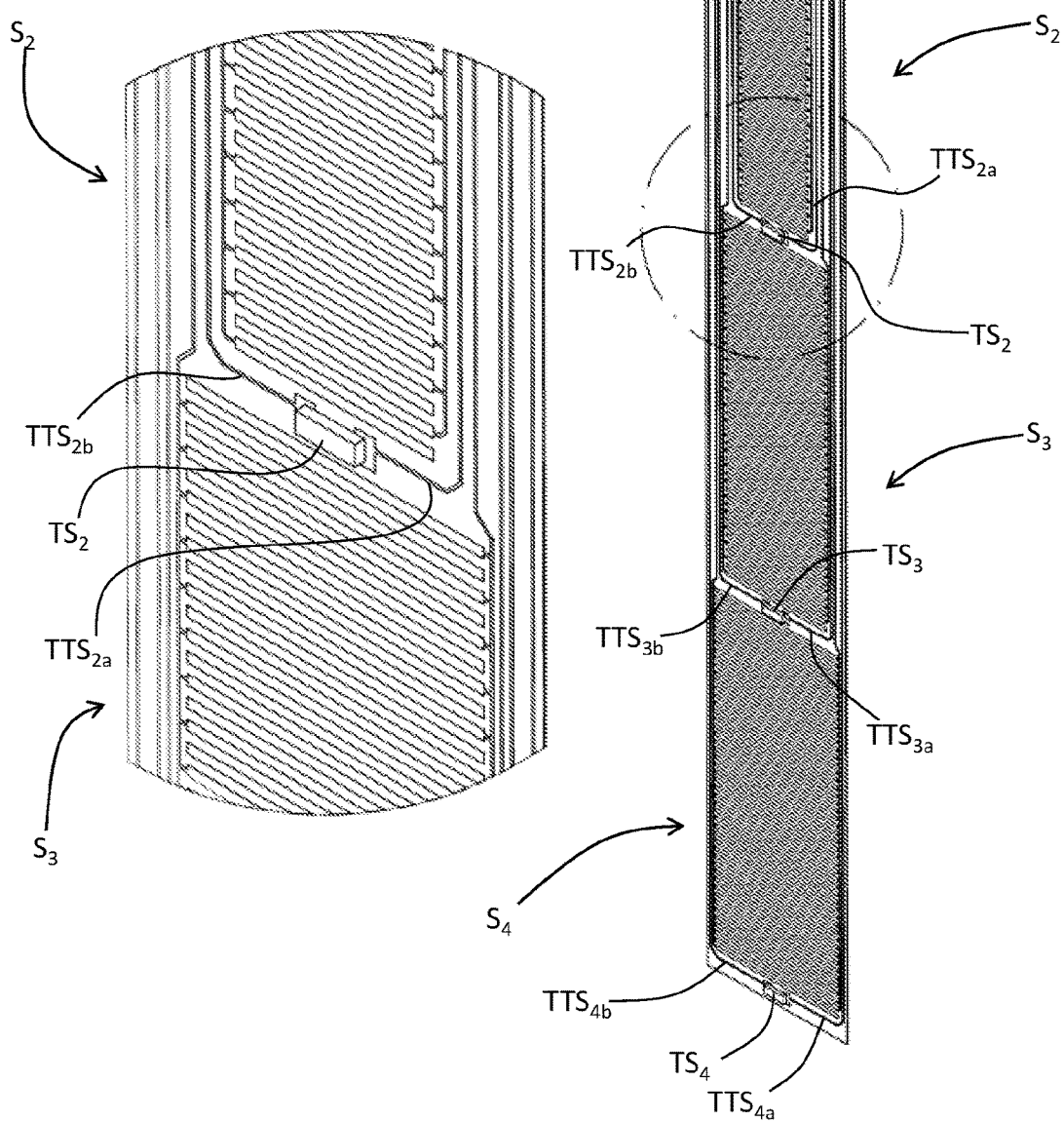
FIG. 14 is a detail at a larger scale of the sensor of FIG. 13.

An example of this type is shown in FIGS. 13-14, in relation to a sensor 1 the detection structure of which is divided into four sections $S_1$, $S_2$, $S_3$, and $S_4$, where the corresponding temperature-sensor elements are designated by $TS_1$, $TS_2$, $TS_3$, and $TS_4$, respectively. Each temperature-sensor element $TS_1$, $TS_2$, $TS_3$, and $TS_4$, is connected to respective pads of the connection structure 3 via a respective pair of tracks made of electrically conductive material, designated by $TTS_{1a}$-$TTS_{1b}$, $TTS_{2a}$-$TTS_{2b}$, $TTS_{3a}$-$TTS_{3b}$, and $TTS_{4a}$-$TTS_{4b}$, for example deposited on one of the two layers or sheets 2a of the supporting structure 2. According to possible embodiments, two or more of the aforesaid temperature-sensor elements $TS_1$, $TS_2$, $TS_3$, and $TS_4$ could have an electrical track in common for connection to a pad of the connection structure 3 made of electrically conductive material.

The aforesaid temperature-sensor elements may advantageously be made of a material having an electrical resistance with negative temperature coefficient (NTC), which is also deposited on a sheet 2a of the supporting structure. However, not excluded in principle is the possibility of providing the aforesaid temperature-sensor elements as preformed components, such as electronic components, that can be mounted on one of the sheets 2a of the supporting structure 2, for example using the SMD technique.

The information of temperature that can be detected via the temperature-sensor element TS, or each temperature-sensor element $TS_{(n)}$, can be used by the control circuit of the level sensor 1 for compensating the measurements made via the measurement electrodes E of the corresponding sections S. The presence of a temperature gradient within the container of the liquid undergoing measurement may have repercussions on the level sensor 1, leading to different temperatures its its different sections S and parts of its supporting structure 2, thereby introducing measurement errors. Compensation, in the presence of such a gradient, may be carried out in various ways.

For example, in the case exemplified in FIGS. 13 and 14, detection of a temperature gradient may be made on the basis of information that can be inferred from the various temperature-sensor elements $TS_1$-$TS_4$, set at different heights in the direction of length X. With reference to FIG. 13, and assuming that the level of the liquid corresponds to the section $S_3$, the measurement of capacitance in this section will be generically compensated via the measurement made by the corresponding temperature-sensor element $TS_3$. The possible presence of a temperature gradient within the container of the liquid (here purposely exaggerated) could, however, generate a temperature error that reflects on the measurement: as has been said, this gradient can be detected via measurements made by the other temperature-sensor elements $TS_1$, $TS_2$ and $TS_4$, which are further up and further down with respect to the sensor element $TS_3$.

According to a different approach, it is also possible to exploit information that can be inferred from the electrodes E of other detection sections J, even in the absence of specific temperature-sensor elements. For example, if—as has been said—the level of the liquid corresponds to the section $S_3$, the detection parts J of the underlying section $S_4$ are immersed in the liquid, whereas the detection parts J of the overlying sections $S_2$ and $S_1$ are in air. Knowing, on the basis of experimental measurements made during design and/or calibrations carried out in the production stage, what are the theoretical values of capacitance in condition of immersion in that particular liquid or else in air for the elements J of the various sections $S_1$-$S_4$, at a given temperature (for example, at 20° C.), the control electronics of the sensor 1 will be able to estimate at what temperature the measurement electrodes E are currently, on the basis of the difference between the theoretical value and the currently measured value, namely, $$\text{current temperature of electrodes of a section} = (a) - (b)$$

where (a) is the theoretical electrical capacitance on the electrodes themselves (whether immersed or in air), and (b) is the electrical capacitance effectively measured currently on the electrodes themselves (whether immersed or in air, respectively). As may be seen, thanks to the electrodes E of the nearby sections S, the control electronics is able to obtain information on the actual temperature of the electrodes E where the liquid is present and compensate, in regard to the temperature gradient, the corresponding measured value of capacitance.

Likewise it is also possible to exploit information that can be inferred from the electrodes E of other detection sections J in order to derive information on the quality and/or one or more other characteristics of the fluid, in particular chemicophysical characteristics. For example, if, as has been said, the level of the liquid corresponds to the section $S_3$, the detection parts J of the underlying section $S_4$ will be immersed in the liquid, whereas the detection parts J of the overlying sections $S_2$ and $S_1$ will be in air. Knowing, on the basis of experimental measurements made during design and/or calibrations carried out in the production stage, what are the theoretical values of capacitance in conditions of immersion in that particular liquid defined by the application, the control electronics of the sensor 1 will be able to compensate for possible variations of the qualitative characteristics of the liquid currently present on the measurement electrodes E, on the basis of the difference between the theoretical value and the currently measured value, namely, $$\text{quality of the liquid on the electrodes of a section} = (a) - (b)$$

where (a) is the theoretical electrical capacitance on the electrodes themselves immersed in the liquid with the characteristics expected by the application, and (b) is the electrical capacitance effectively measured currently on the electrodes themselves immersed in the liquid with the current characteristics. As may be seen, thanks to the electrodes E of the nearby sections S, the control electronics is able to obtain information on the actual quality of the liquid in which the electrodes E are immersed, and compensate, as a function of this information, the corresponding measured value of capacitance.

Another possible method for compensation of the temperature gradient is based instead upon the use of a single reference electrode for the detection structure, for example, the reference electrode $J_r$ of FIGS. 10-11. In an embodiment of this type, the electrode $J_r$ is used as reference for the detections in the lower section (the section $S_3$, in the example of FIG. 10), enabling a differential measurement that comes to compensate the temperature, as likewise the other causes of common-mode noise (temperature, characteristics of the fluid, etc.). Consider the case of a sensor of the type shown in FIGS. 10-11, but with four detection sections $S_1$-$S_4$, where the single reference electrode $J_r$ is underneath the section $S_4$: when the level of the liquid corresponds, for example, to the section $S_3$, the section $S_4$ is completely immersed, and the already compensated value of capacitance for the section $S_4$ may be used as reference for the section $S_3$. Likewise, when the level of the liquid corresponds to the section $S_2$, also the section $S_3$ will be completely immersed, the measured value of capacitance of which may be used, together with the one corresponding to the section $S_4$ which is also immersed, as reference for the section $S_3$. When the level of the liquid corresponds, instead, to the section $S_1$, also the section $S_2$ will be completely immersed, the measured value of capacitance of which may be used, together with the others, as reference for the section $S_1$.

The measurement of capacitance made via the single element $J_r$ depends upon the dielectric constant of the fluid being measured. Hence, in this sense, the measurement of capacitance obtained also indicates the quality and/or characteristics of the fluid or medium undergoing measurement. If, for example, the fluid being measured were diluted, then the measurement of capacitance on the reference electrode $J_r$ would be different from the case where the fluid were pure. Likewise, if the fluid were of a type different from the one expected, the capacitance measured on the reference electrode $J_r$ would be different from the one expected for that fluid. In this way, via the measurement made on the electrode $J_r$, it is possible to have indications on the quality of the fluid at the moment of measurement. In an embodiment of this type, the electrode $J_r$ is used as reference for the detections of the lower section, for example the section $S_3$ of FIGS. 10-11, enabling a differential measurement that comes to compensate the quality of the fluid.

A further method for compensation of the temperature gradient may be based upon the use of reference electrodes in each detection section, for example the reference electrodes $J_{1r}$, $J_{2r}$, $J_{3r}$, $J_{4r}$ of FIG. 12. Such a methodology requires more electrical connections than the previous version, but is more accurate. Hence, in this case, the measurement of capacitance at each section S can be correlated to a single detection of capacitance made via the corresponding reference electrode, with a measurement of a differential type. The temperature has an effect on the measurement electrodes E of one section S as likewise on the corresponding reference electrode $J_{(n)r}$: hence, thanks to the differential measurement, the effect of the temperature (which is a common-mode effect) can be cancelled out.

Use of the reference electrode $J_{(n)r}$ may enable also compensation of variations of the characteristics of the liquid, and hence of its quality, rendering in general the measurement more stable and above all guaranteeing a robust measurement even in case of separation of phase of the liquid (for example, when the percentage of water in the Diesel oil contained in a tank exceeds a certain threshold, separation of phase occurs, and in the tank a layer of water separated from the Diesel oil may be created).

For a detailed description of possible calibration and/or compensation methodologies, even in the presence of temperature gradients, using one or more reference electrodes and/or one or more temperature-sensor elements, the reader is referred to WO 2017/109765 filed in the name of the present applicant, the contents of which are understood as being incorporated herein for reference.

An example of operation will be now provided in relation to a level sensor 1 of the type shown in FIG. 1, i.e., having a detection part divided into four detection sections $S_1$-$S_4$, where each section comprises two interdigitated electrodes designed to supply a measurement of electrical capacitance that depends upon the amount of liquid that wets the electrodes themselves, i.e., their detection parts J. Hence, for each section S, a measurement will be obtained that may be comprised between two values:

$C_{(n)\ air\ eff}$: detection parts J of the section $S_{(n)}$ completely in air, and $C_{(n)\ liquid\ eff}$: detection parts J of the section $S_{(n)}$ completely immersed.

The sensor 1 is hence able to measure a level Q given by $$Q = Q_1 + Q_2 + Q_3 + Q_4$$

which is calculated on the basis of the measurement of the capacitance $$C = C_1 + C_2 + C_3 + C_4$$

In what follows, denoted by $C_{(n)(x)}$ is the value of capacitance associated to a certain level "x" of the liquid, which is comprised between $C_{(n)\ air\ eff}$ and $C_{(n)\ liquid\ eff}$ (i.e., higher than $C_{(n)\ air\ eff}$ and lower than $C_{(n)\ liquid\ eff}$).

During the manufacturing process, after the sensor 1 has been physically produced, a calibration stage is carried out. The purpose of this stage is to make measurements of capacitance with the sensor 1 in different conditions and store these measurements within the control electronics of the sensor itself, to enable thereafter—during subsequent operation—use of this stored information to calculate and optimize the level information supplied by the sensor. In various preferential embodiments, the calibration comprises two steps, represented by:

i) detections of capacitance with all the electrodes E of the sensor in air, obtained from which and stored are the values of capacitance in air $C_{(n)\ air}$ for each pair of electrodes E of each section S; and ii) detections of capacitance with all the electrodes E of the sensor immersed in a liquid sample, obtained from which and stored are the values of capacitance in the immersed condition $C_{(n)\ liquid}$ for each pair of electrodes E of each section S.

The level $Q_{(n)}$ corresponding to each pair of electrodes E is calculated on the basis of the information of capacitance $C_{(n)}$ measured on the "n" pairs of electrodes E that make up the detection structure of the sensor, i.e., its detection sections S. This transformation will be indicated in what follows by the following formula:

$$Q_{(n)} \propto C_{(n)(x)}$$

where the symbol "$\propto$" represents the proportionality between the measurement of capacitance C and the level Q of the fluid. This transformation, through the use of coefficients that depend upon the global geometry of the sensor 1, also has the function of passing from a measurement of capacitance expressed in farads (F) to a measurement of level expressed in millimetres (mm).

Now assume that a level sensor 1 of the type illustrated in FIGS. 1 and 2a-2b is installed in a 4-litres container and that, for simplicity of explanation, each of the sections $S_1$-$S_4$ of the sensor is designed to measure the height of 1 litre of liquid. The cases listed below are possible.

1) Level (x) of the liquid corresponding to the lower section $S_4$

The control electronics of the sensor 1 makes the measurement of capacitance between the electrodes E of the section $S_4$. Given that the detected capacitance $C_{4(x)}$, which represents the level (x), will be different from the value stored $C_{4\ air}$, the control electronics will recognize the presence of liquid and will calculate the value of the level from the measurement obtained previously, i.e., $Q_4 \propto C_{4(x)}$.

2) Level (x) of the liquid corresponding to the intermediate section $S_3$

The control electronics of the sensor 1 makes the measurement of capacitance between the electrodes E of the section $S_3$, thus obtaining the value of capacitance $C_{3(x)}$, which represents the level (x). Also in this case, given that the detected capacitance $C_{3(x)}$ will be different from the values stored of $C_{3\ air}$ and $C_{3\ liquid}$ (in particular, it is comprised between said values), the control electronics will recognize the presence of liquid and will make a measurement of capacitance in the section S that is closest to the one where the level of the liquid is located and that is completely immersed in the liquid, i.e., the section $S_4$, in the example considered.

An effective value of capacitance for the section $S_4$ is thus obtained equal to $C_{4\ liquid\ eff}$. This value of capacitance $C_{4\ liquid\ eff}$ may be affected, at that precise moment, also by the temperature and the chemico/physical characteristics of the liquid (electric conductivity, dielectric constant, etc.), i.e., by the quality of the liquid. In the calculation of the level $Q_3$ from the measurement $C_{3(x)}$, it is hence possible to use the measurement $C_{4\ liquid\ eff}$ to eliminate the effect of temperature and of the characteristics of the fluid. The electronics hence obtains a differential and relative measurement by applying the following formula:

$$Q_3 \propto (C_{3(x)} - C_{4\ liquid\ eff}) / (C_{3(x)} + C_{4\ liquid})$$

where the measurement of the level $Q_3$ is thus independent of the temperature and of the characteristics of the fluid.

3) Level (x) of the liquid corresponding to the intermediate section $S_2$

As in the previous case, the control electronics makes the measurement of capacitance between the electrodes E of the section $S_2$, thus obtaining the value of capacitance $C_{2(x)}$ that represents the level (x), which will be different from the stored value $C_{2\ air}$. The electronics will then make the measurement of capacitance in the completely immersed closest section S, i.e., the section $S_3$, obtaining the corresponding value of effective capacitance $C_{3\ liquid\ eff}$ possibly affected by the temperature and by the chemico/physical characteristics of the liquid. The electronics will then obtain a differential and relative measurement by applying the following formula:

$$Q_2 \propto (C_{2(x)} - C_{3\ liquid\ eff}) / (C_{2(x)} + C_{3\ liquid\ eff})$$

where the measurement of the level $Q_2$ is thus independent of the temperature and of the characteristics of the fluid.

4) Level (x) of the liquid corresponding to the upper section $S_1$

As may be readily understood, also in this case a logic similar to the one described in points 2) and 3) above will be followed, with the electronics that obtains a differential and relative measurement by applying the following formula:

$$Q_1 \propto (C_{1(x)} - C_{2\ liquid\ eff}) / (C_{1(x)} + C_{2\ liquid\ eff})$$

where the measurement of the level $Q_1$ is thus independent of the temperature and of the characteristics of the fluid.

Hence, in summary, in any measurement cycle, the control electronics makes sequentially a measurement of capacitance for each section S, identifying the section where the level of the liquid is located (just one section S will yield in fact a capacitance $C_{(n)(x)}$ comprised between $C_{(n)\ air}$ and $C_{(n)\ liquid}$, whereas all the other sections S will yield a value of capacitance equal or in any case very close to $C_{(n)\ air}$ or $C_{(n)\ liquid}$).

If it is not possible to identify a level (x) at one section S, this means that two different cases may exist:

a) the container is completely empty (i.e., all the sections S of the sensor are completely in air), and in this case the pairs of electrodes of each section S will yield a value of capacitance equal or very close to $C_{(n)\ air}$, with the output signal of the sensor that will be set at zero; or else b) the level of the liquid is exactly between two sections S, and in this case the output signal of the sensor will correspond to the value of the level $Q_{(n)}$ of the last completely immersed section (value calculated and normalized via the effective value detected for the underlying section, as explained in points 2) and 3) above).

Once the section S where the level of liquid is located has been identified, the electronics identifies the section S closest to it that is completely immersed, i.e., the section $S_{(n+1)}$ (in the case of level (x) in the lower section S this will not be possible). The electronics then makes the measurement of capacitance for the section $S_{(n+1)}$, to obtain the value $C_{(n+1)\ liquid\ eff}$, and then calculates the level $Q_{(n)}$ in a differential and relative way by applying the formula $$Q_{(n)} \propto (C_{(n)(x)} - C_{(n+1)liquid\ eff})/(C_{(n)(x)} + C_{(n+1)liquid\ eff})$$

At the end of reading of all the electrodes, the value of total level Q is calculated from the sum of all the contributions $Q_{(n)}$ of the various sections S.

The method described applies to all the electrodes E that form the detection structure. As has been said, in the case where the level corresponds to the lowest section (the section $S_4$, in the example), it is not, however, possible to apply this method. In the example, the section $S_4$ is in fact a detection section where it is not possible to apply the aforesaid formula to obtain a differential and relative measurement: this means that the measurement of level made in this section is less accurate than that of the other sections. A solution to overcome this drawback is to provide the section $S_4$ with a reference electrode, such as the electrode $J_r$ of FIGS. 10-11, or the electrode $J_{4r}$ of FIG. 12, to enable application of the formula as described previously. In this case, the area occupied by the reference electrode is external to the measurement area.

The advantages of this method, as described, regard the possibility of obtaining a differential and relative measurement of level. This proves very useful during normal operation of the sensor 1 in its application context, and is particularly more useful in the case of stratification of the liquid within the tank (for example, in the case referred to above of separation that may occur between Diesel oil and water).

The formula provided in the previous passages $$Q_{(n)} \propto (C_{(n)(x)} - C_{(n+1)liquid\ eff})/(C_{(n)(x)} + C_{(n+1)liquid\ eff})$$

represents the most precise method of calculation to obtain a differential and relative measurement. In the case where the aim is to save computational capacity of the processor of the control circuit or to reduce the computational times, it is possible to use simpler formulas that represent an approximation of the extended one, for example:

$$Q_{(n)} \propto (C_{(n)(x)} - C_{(n+1)liquid\ eff})/C_{(n+1)liquid\ eff}$$

or else $$Q_{(n)} \propto (C_{(n)(x)}/C_{(n+1)liquid\ eff})$$

In the embodiments previously exemplified, the detection parts J of the electrodes E of the various sections S are in a centred position with respect to the supporting structure 2, taking as reference the width of the latter. However, this does not constitute an essential characteristic. In this perspective, while maintaining the preferential arrangement with scaling widths W of the various sections S, the corresponding electrodes E may be aligned on one of the two sides.

Figure 15:
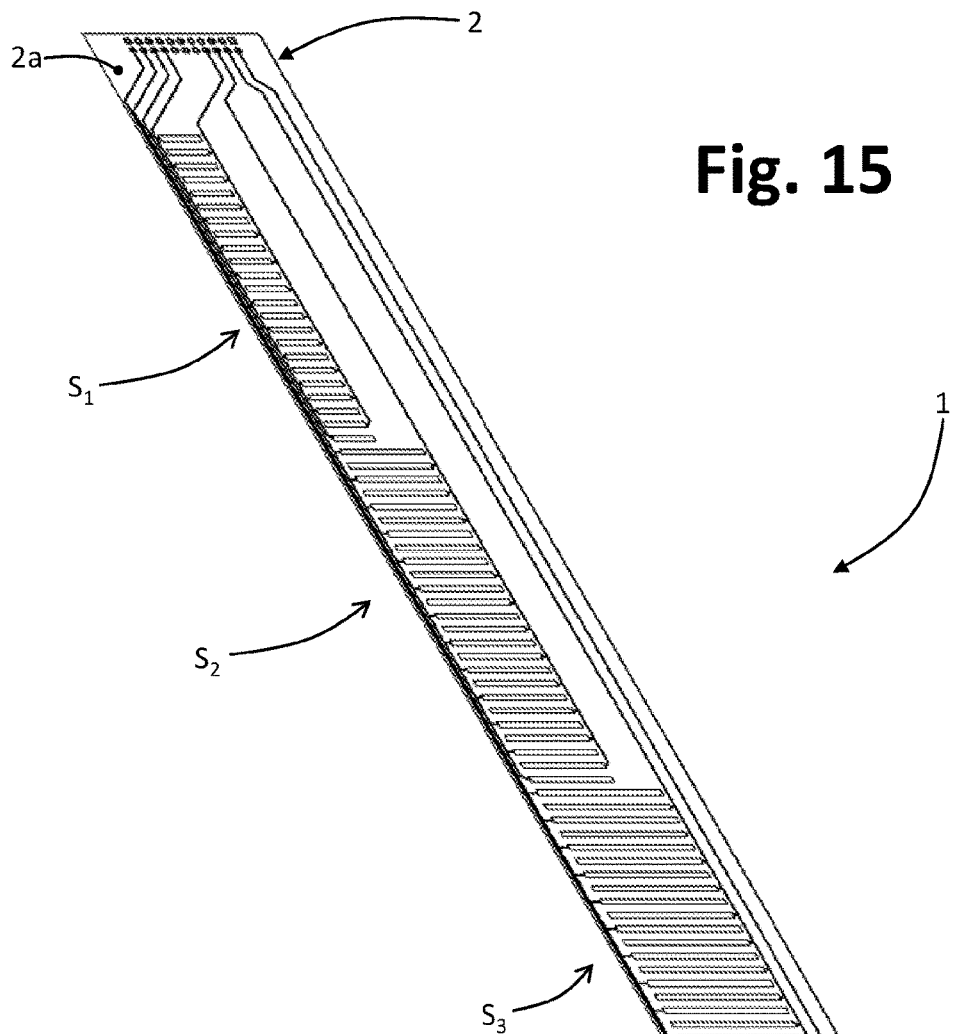
FIG. 15 is a schematic perspective view of a level sensor according to further possible embodiments of the invention.
Figure 16:
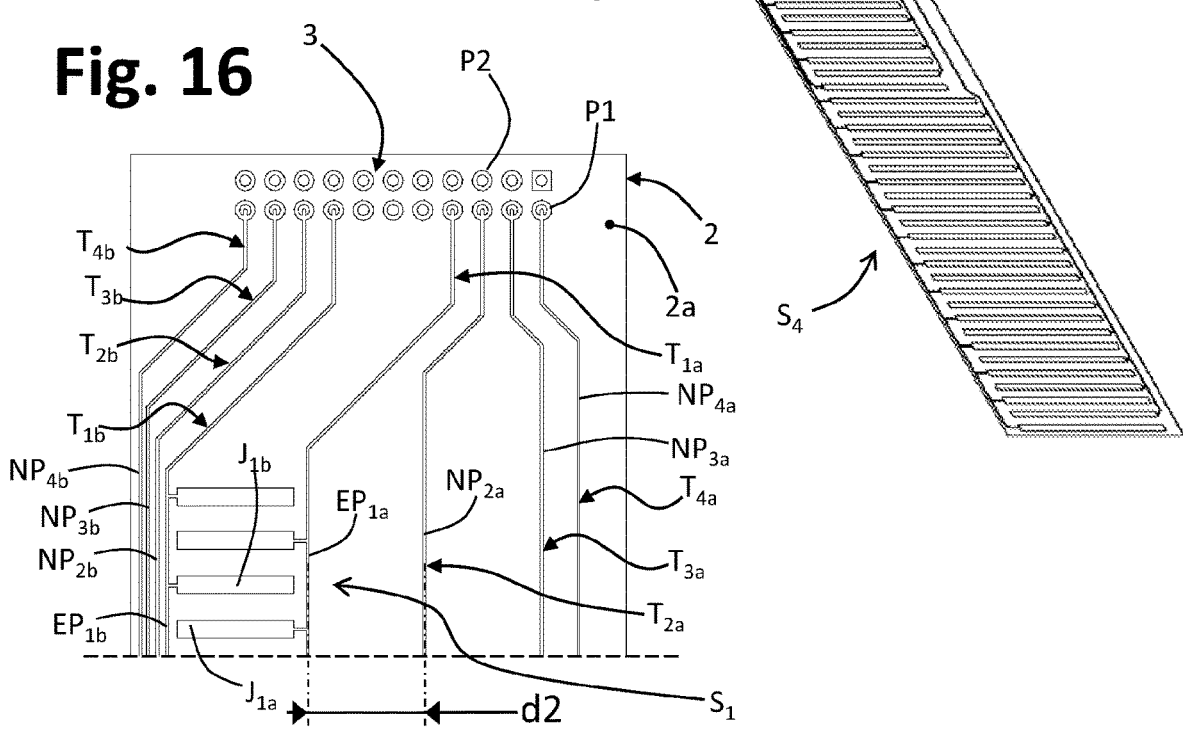
FIG. 16 is a detailed front view of a portion of the sensor of FIG. 15.

FIGS. 15-16 highlight an example in this sense, where the detection parts J of the various electrodes are aligned along the left-hand side of the supporting structure 2: as has been said, while maintaining the preferential arrangement with scaling widths W of the detection parts J of the pairs of electrodes of the various sections S, it is in any case possible to provide, on the right-hand side, sufficient space to arrange the connection parts T at the distance d2, such as to eliminate or in any case reduce the parasitic capacitances, as described previously in relation to FIG. 2b.

From the detail of FIG. 16, it may be noted for example how, at the section $S_1$, on the right-hand side of the structure 2 the non-effective portion $NP_{2a}$ of the connection part $T_{2a}$ is in any case at the distance d2 from the effective portion $EP_{1a}$ of the connection part $T_{1a}$, whereas the non-effective portions $NP_{3a}$ and $NP_{4a}$ of the connection parts $T_{3a}$ and $T_{4a}$ are further away from the aforesaid effective portion $EP_{1a}$.

Conversely, on the left-hand side of the structure 2, the effective portion $EP_{1b}$ of the connection part $T_{1b}$ is relatively close to the non-effective portion $NP_{2b}$ of the connection part $T_{2b}$, and also to the non-effective portions $NP_{3b}$ and $NP_{4b}$ of the connection parts $T_{3b}$ and $T_{4b}$. However, as explained, in various preferential embodiments, for the purposes of detection of capacitance in a detection section, one first electrode E will be set at an electrical potential and the second electrode E will be set at the opposite electrical potential (for example, ground), together with all the other electrodes of the other detection sections S. Hence, with reference to the example of FIG. 16, the effective portion $EP_{1a}$ will be, for example, at the positive potential, and sufficiently spaced apart (distance d2) from the non-effective portions $NP_{2a}$, $NP_{3a}$ and $NP_{4a}$ at the negative potential, so as to limit or cancel out the corresponding parasitic capacitances. Conversely, on the opposite side, the effective portion $EP_{1b}$ will also be at the negative potential, together with the non-effective portions $NP_{2b}$, $NP_{3b}$, and $NP_{4b}$, thereby preventing the relative proximity between the aforesaid portions from giving rise to parasitic capacitances.

Figures 17, 18:
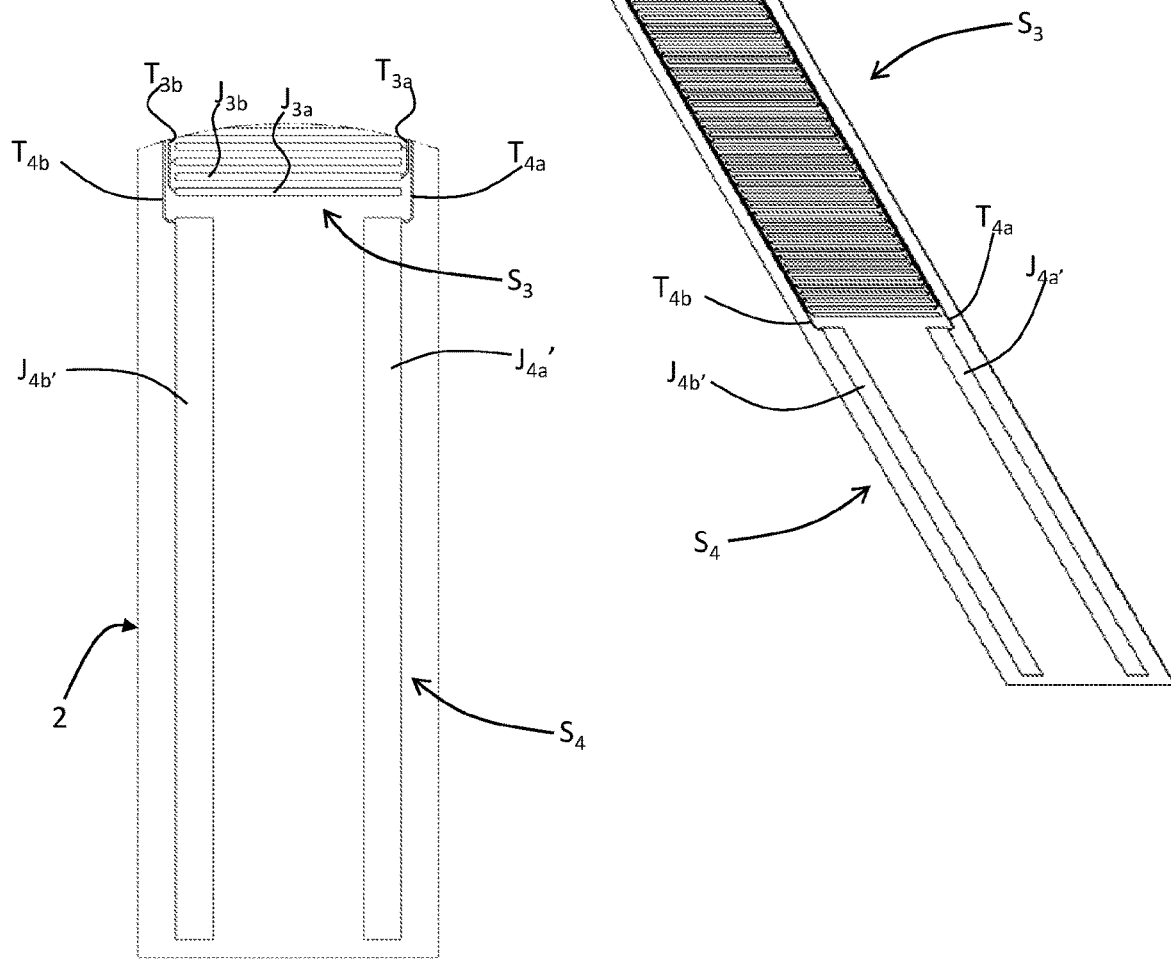
FIG. 17 is a schematic perspective view of a level sensor according to further possible embodiments of the invention.
FIG. 18 is a detailed front view of a portion of the sensor of FIG. 17.

In various embodiments, the level sensor comprises first detection sections made according to what has been described previously, and at least one second detection section devised in a different way. Such a case is exemplified in FIGS. 17 and 18, which illustrate a sensor 1 in which the lower detection section $S_4$ has a structure different from that of the overlying sections $S_1$-$S_3$. In the example, the detection parts $J_{4a'}$ and $J_{4b'}$ of the section $S_4$ are in the form of plates axially elongated in the direction of length of the sensor, arranged generally parallel to one another, and hence without detection parts in interdigitated configuration. The principle of operation of the sensor 1 in any case remains the same as the one previously described, with the difference that in this case the lower detection section $S_4$ will present a measurement resolution decidedly lower than that of the overlying sections $S_1$-$S_3$.

In various embodiments, the level sensor according to the invention comprises a number of level-detection structures, preferably connected to one and the same electrical-connection structure 3.

For example, in various embodiments, the supporting structure of a level sensor may carry two detection structures set side by side, preferably both divided into an equal number of detection sections, in order to improve precision of detection.

In preferential embodiments of this type, the detection parts J of the electrodes of one structure may be staggered in the direction of length X with respect to the detection parts J of the electrodes of the structure set alongside, for example to detect with the second structure levels intermediate between those that can be detected with the first structure, thereby doubling the measurement resolution.

Figure 19:
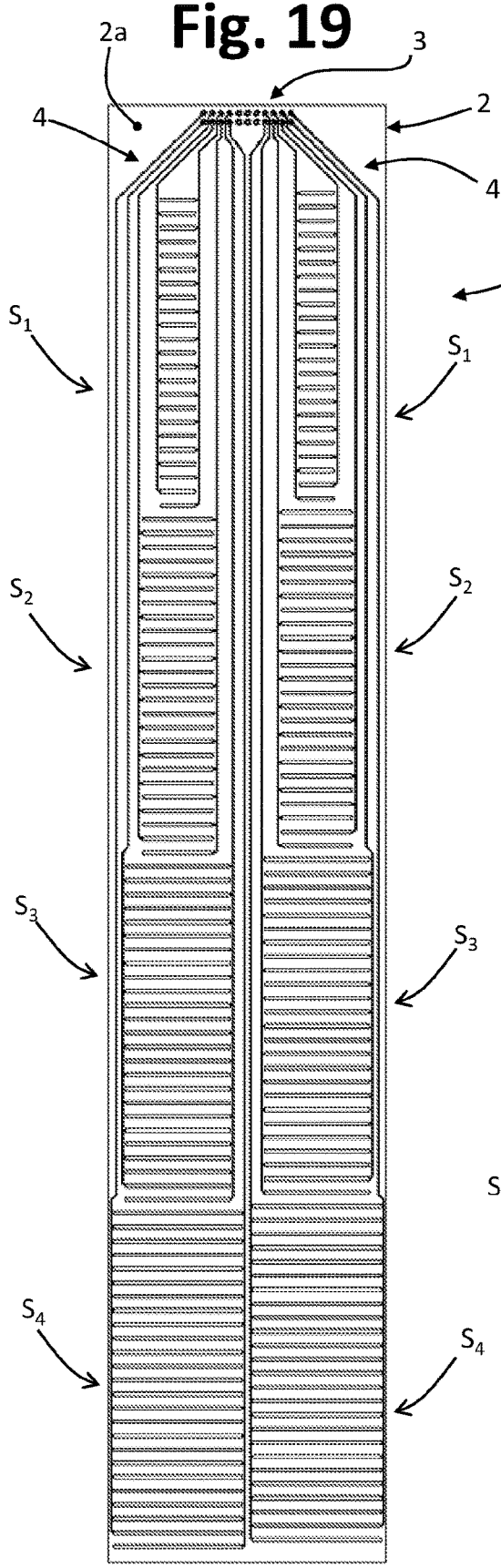
FIG. 19 is a schematic view in front elevation of a level sensor according to possible embodiments of the invention.
Figure 20:
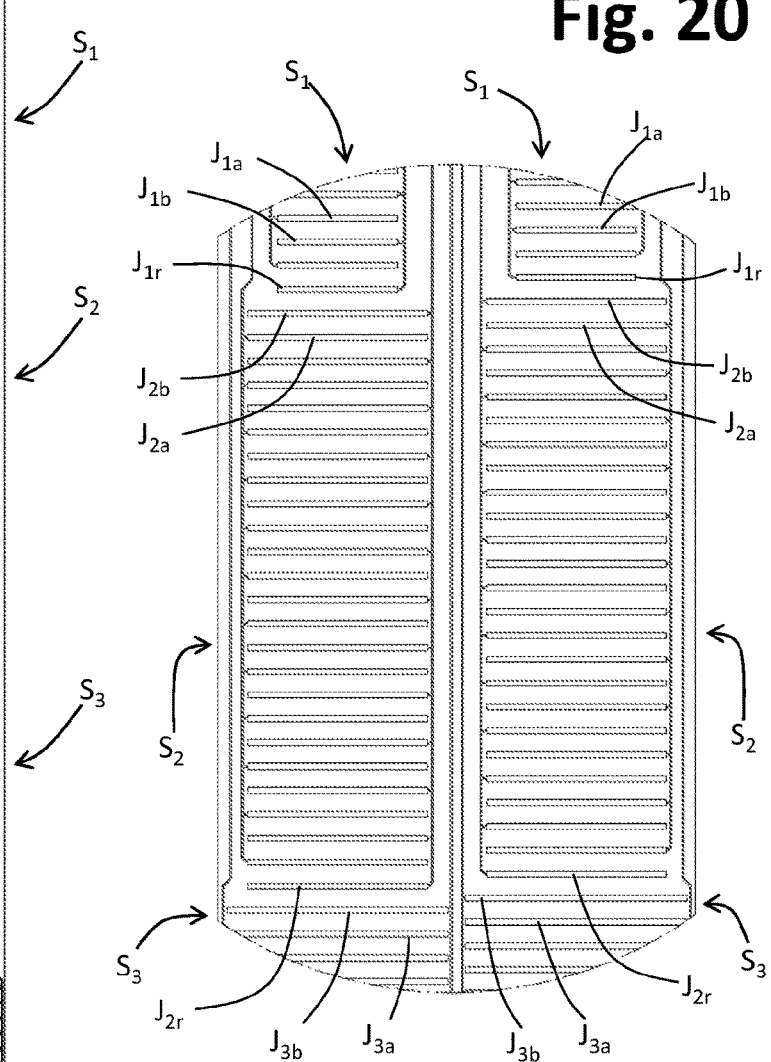
FIG. 20 illustrates a detail at a larger scale of the sensor of FIG. 19.

FIGS. 19-20 illustrate an example in this sense, where provided on the structure 2, i.e., within the two layers or sheets 2a that form it, are two detection structures 4 set side by side, each divided into four detection sections $S_1$-$S_4$. As may be seen in the detail of FIG. 20, the detection parts J of the homologous structures S are staggered with respect to one another in the direction of length, thus enabling increase in the overall measurement resolution of the sensor 1.

As in the case described previously, in various embodiments, the supporting structure of a level sensor may carry two detection structures on two of its opposite surfaces, preferably both divided into an equal number of detection sections, also in this case in order to improve precision of detection. The two detection structures may be defined on the two opposite major faces of one and the same flexible support. Also in preferential embodiments of this type, the detection parts J of the electrodes of the detection structure defined on one face of the aforesaid support may be staggered, in the direction of length X, with respect to the detection parts J of the electrodes of the detection structure defined on the opposite face of the same support. FIGS. 21-22 illustrate an example in this sense, where provided on each of the two opposite major faces of one and the same flexible support 2c is a respective detection structure 4, each structure 4 being divided into four detection sections $S_1$-$S_4$. The flexible support 2c can be enclosed between two layers or sheets of the type previously designated by 2a, or else in a different electrically insulating housing.

As mentioned, and as may be understood from the comparison between FIGS. 21 and 22, the detection parts J of the homologous structures S may be advantageously staggered with respect to one another in the direction of length of the sensor, thus enabling increase in the overall measurement resolution of the sensor 1.

Figure 23:
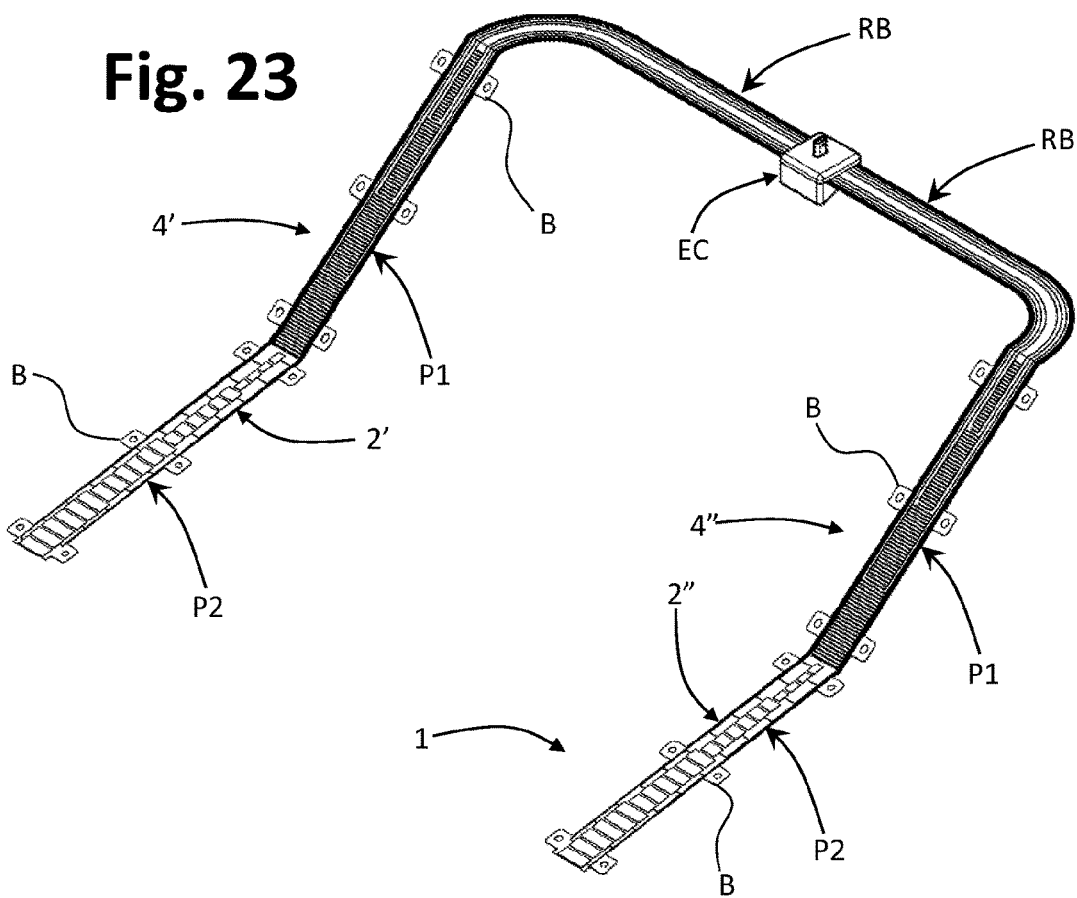
FIGS. 23 and 24 are schematic views, respectively a perspective view and a view in front elevation, of a level sensor according to possible embodiments of the invention.
Figure 24:
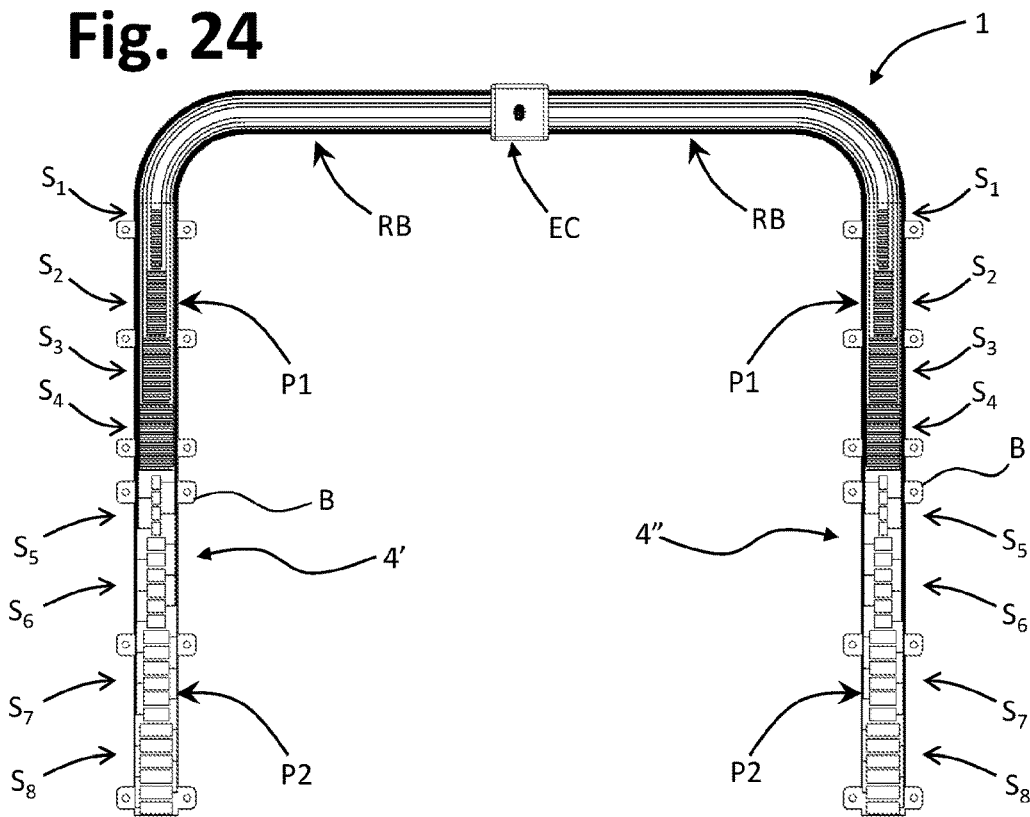

In various embodiments, the level sensor 1 according to the invention comprises a number of level-detection structures, each carried by a respective supporting structure, but preferably electrically connected to one and the same electrical-connection structure. For example, FIGS. 23-24 illustrate the case of a sensor 1 that comprises a first level-detection structure 4' and a second level-detection structure 4", which extend in positions generally set side by side in the direction of length and are both connected to an electrical-connection structure. In the case exemplified, the two structures 4' and 4" are each carried by a corresponding flexible supporting structure 2' and 2", respectively, for example of the type indicated previously.

The two detection structures 4', 4" may comprise one and the same number of detection sections S. In the case exemplified, each detection structure 4,' 4" includes eight detection sections, designated by $S_1$—$S_8$, for example with a configuration of the type shown in FIG. 9. The two detection structures 4', 4" may be electrically connected to one and the same connection and control unit, designated as a whole by EC, for example via a portion RB of the supporting structure 2 with corresponding electrically conductive tracks T or via flexible flat cables or the like with a number of conductors.

As may be noted, the sensor of FIGS. 23-24 has a substantially U-shaped overall configuration, i.e., with the two detection structures 4' and 4" at least in part generally parallel to one another, preferably joined by at least one curved and/or orthogonal or inclined stretch RB, where, for example, each of the two detection structures 4' and 4" has a substantially L-shaped overall configuration, i.e., formed by two stretches orthogonal or inclined with respect to one another, preferably joined by a curved stretch.

Configurations of this type are, for example, useful in the cases where the container or tank of the liquid undergoing level detection includes a number of distinct compartments or else a number of distinct accumulation areas, for example the so-called saddle tanks, in particular fuel saddle tanks for vehicles.

Figure 25:
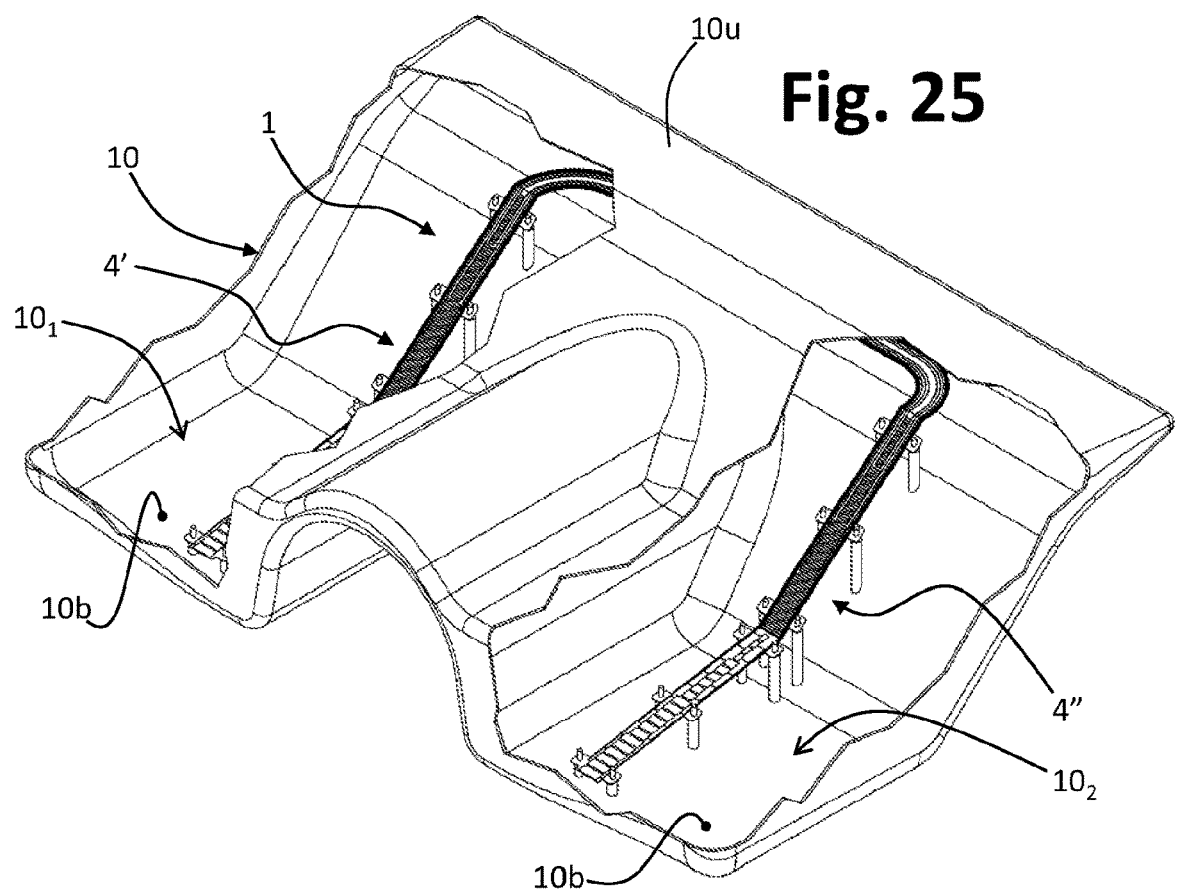
FIG. 25 is a schematic perspective view, partially sectioned, of a generic container mounted in which is a level sensor according to possible embodiments of the invention.

FIG. 25 exemplifies for this purpose the case of a container or tank 10 with a number of compartments or a number of accumulation areas distinct from one another, such as a tank for vehicles, for example of the saddle type, the bottom 10b of which is shaped so as to define two distinct accumulation areas designated by $10_1$ and $10_2$, generally parallel to one another (of course, each of the areas $10_1$ and $10_2$ has a respective outlet for the liquid, not represented).

Each of the two structures 1' and 1" extends, in the direction of length, in part in a respective accumulation area $10_1$ and $10_2$. It will hence be appreciated that, via the detection structures 4' and 4" it is possible to detect in an independent way the presence and the level of the liquid in each of the two accumulation areas $10_1$ and $10_2$.

As may be noted, in their installed condition, the two structures 4' and 4" are generally bent within the container 10, in particular substantially at the transition between the sections S4 and S5 (see FIG. 24), thus giving rise to two areas with different inclination for each structure, which are designated by P1 and P2.

In the example, the two areas P1, P2 of each structure 4', 4" are provided with detection sections of a different type, which, as has been said, are similar to the case shown in FIG. 9, the two areas P1 and P2 possibly being distinguished by different resolutions of measurement. For example, the areas P1 provided with the detection sections $S_1$-$S_4$ could be distinguished by a higher measurement resolution than the areas P2 provided with the detection sections $S_5$-$S_8$.

It should in any case be considered that the measurement resolution depends also upon the inclination of the detection elements J with respect to the vertical direction. With reference to the example, the electrodes of the area P2 could also be set with a high inclination to the point of having the same resolution as that of the electrodes of the area P2, which are less inclined with respect to the vertical.

In various embodiments, in any case, the detection structure or structures of the level sensor has/have a plurality of consecutive areas, which extend in respective planes generally at angles with respect to one another, with the corresponding flexible supporting structures that have respective bends or curves at points corresponding to each region of transition between consecutive areas.

Figure 26:
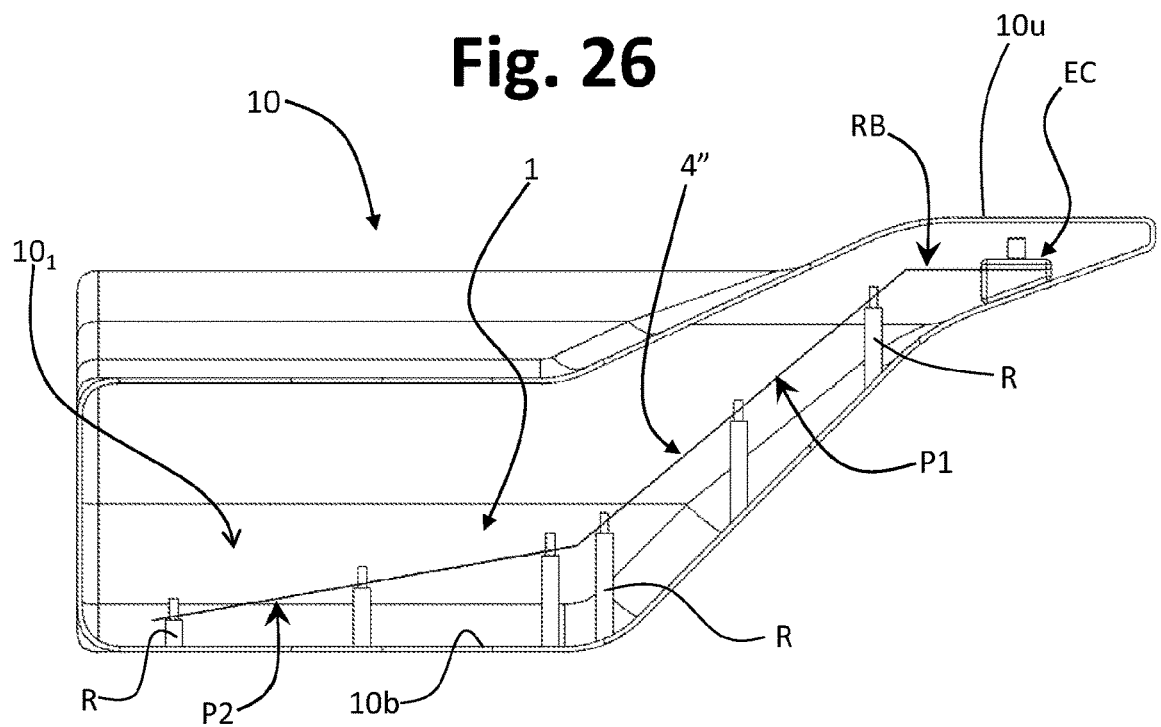
FIG. 26 is a schematic lateral-sectional view of the container of FIG. 25.

In the example of FIGS. 25-26, supports R are represented, integrated or fixed to at least one wall of the container or tank 10, for example at least in part integrated or fixed to a bottom wall 10b and/or a side wall (and/or possibly a top wall), where these supports R are coupled to positioning and/or fixing elements of the level sensor 1, designated by B in FIGS. 23-24. In the case exemplified, the bottom wall 10b is distinguished by wall portions that are at angles with respect to one another (see, for example, FIG. 26); however, similar portions set inclined or at angles could form part of at least one side wall. In the example, the level sensor 1, i.e., the supporting structures 2 of its detection structures 4' and 4", is secured to the bottom wall 10b of the tank 10 thanks to supports R of different height.

With reference in particular to FIG. 26, the arrangement is such that the distal end regions of the two detection structures are each in the proximity of the bottom wall 10b of the tank 10, whereas their proximal ends are in the proximity of the top wall 10u. Of course, the solution of providing areas of a detection structure at different angles can be used also in the case of level sensors that include just one such structure, as in FIG. 9.

Figure 27:
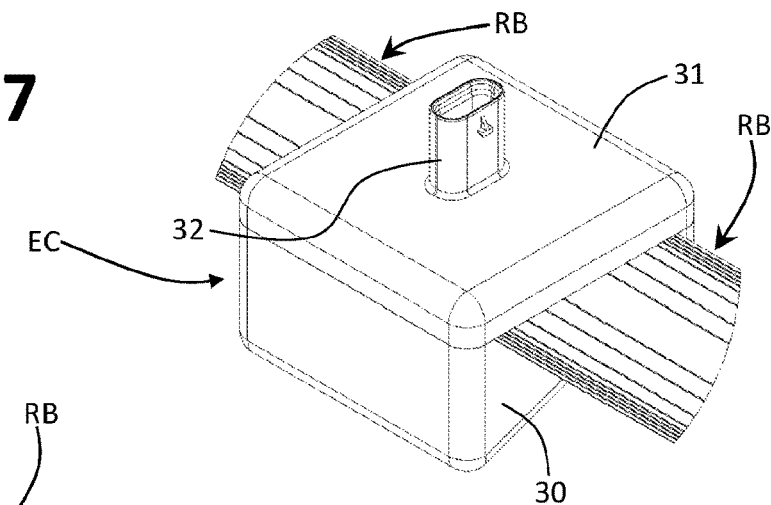
FIGS. 27-28 and 29 are detailed perspective views of some parts of the sensor of FIGS. 23-24 and of the container of FIG. 25, respectively.
Figure 28:
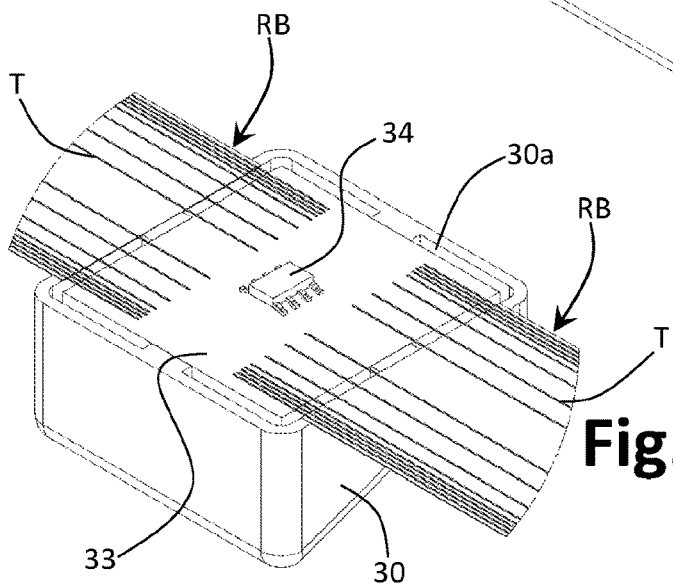

FIGS. 27-28 illustrate schematically a possible embodiment of the aforesaid connection and control unit EC, which has a casing body preferably made up of at least two parts 30, 31, to which stretches RB of the structure 2 or cables are connected. In various embodiments, the aforesaid casing body 30-31 is shaped for housing inside it a processing and/or control circuit, electrically connected to which are the electrodes E of the two detection structures 1, via the stretches of structure RB that carry the respective electrically conductive tracks T. In the case exemplified, the two casing parts 30-31 are shaped to define a chamber 30a between them for housing a circuit support 33, on which there may be mounted the circuit components for control of the level sensor 1, preferably including an electronic control unit 34, such as a microcontroller with associated non-volatile memory means, in which the program for control of the sensor resides.

The electronic unit or processing and/or control circuit preferably comprises at least one from among an oscillator circuit, a circuit designed to generate a frequency signal, a circuit designed to detect an impedance and/or a capacitance and/or an electrical resistance, an amplifier circuit, a controllable switch or a multiplexer or a circuit for switching inputs and/or electrodes, a signal-sampling or sample-and-hold circuit, an analog-to-digital converter, a data-processing circuit, a memory circuit, a data-transmission circuit, preferably for transmission and/or reception in a serial format, very preferably by way of a SENT (Single-Edge Nibble Transmission) interface and/or protocol. In the case of use of a microcontroller, this preferably comprises at least one processing and/or control logic unit, a memory circuit, and inputs and outputs, amongst which inputs of an analog/digital type. As an alternative to the electronic control unit, it could comprise an integrated circuit of an ASIC or FPGA type and an integrated circuit dedicated to performing the functions of analog-to-digital converter.

In the example, the casing body has a part 31, for example a lid, defining at least part of an electrical connector 32 for interfacing of the sensor 1 to an external system, for example an on-board control unit of a vehicle. In the example, an end of the various leads or electrical tracks T, of the stretches RB of the structure 2 or of the aforesaid cables, is connected to the aforesaid processing and/or control circuit, in particular to the circuit support 33. In the case where the stretches RB form an integral part of the two detection structures 4', 4", the corresponding electrical-connection structure 3 is directly connected to the aforesaid processing and/or control circuit, or to the corresponding circuit support 33, whereas in the case where flat cables are provided, one end of the corresponding conductors is connected to the circuit support and the opposite end is connected to the electrical-connection structure 3 of the two detection structures 4', 4" (see for reference FIG. 9).

Figure 29:
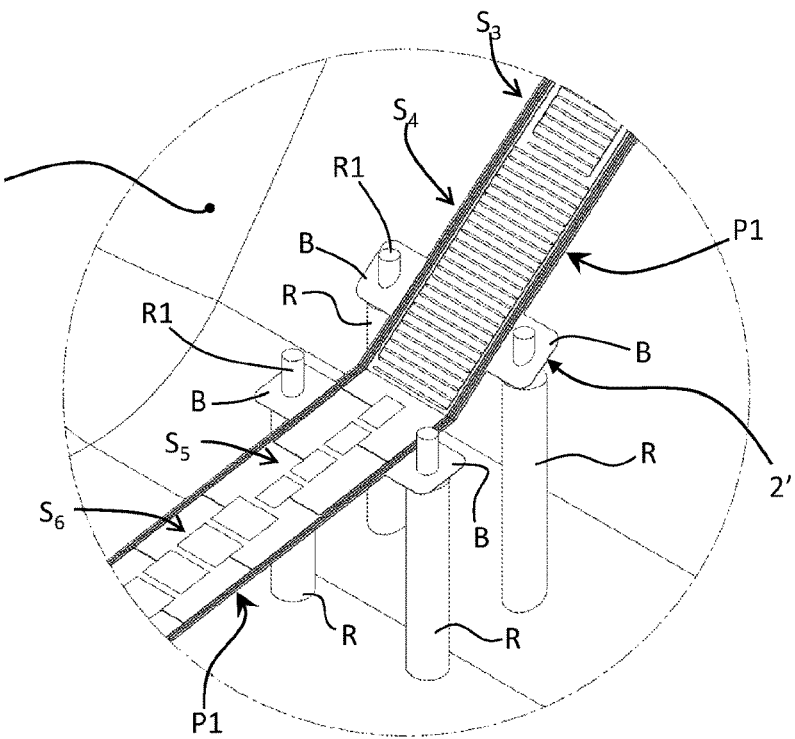

FIG. 29 exemplifies the case of elements B for positioning and fixing of the sensor, defined integrally by the supporting structures 2', 2", for example in the form of small brackets or fixing tabs projecting laterally and provided with at least one passage or seat in which a corresponding fixing portion R1 of the supports R associated to, or integrated in, the tank 10 can be received.

Preferably, the electrodes E of each detection section S of a detection structure of a sensor according to the invention have characteristics of their own and different from those of the electrodes of the other sections. Each pair of electrodes hence preferably has a dedicated geometry, with precise characteristics, for example as a function of the measurement resolution necessary in a given area and/or according to the shape or inclination of the tank or other container of the liquid.

Figure 30:
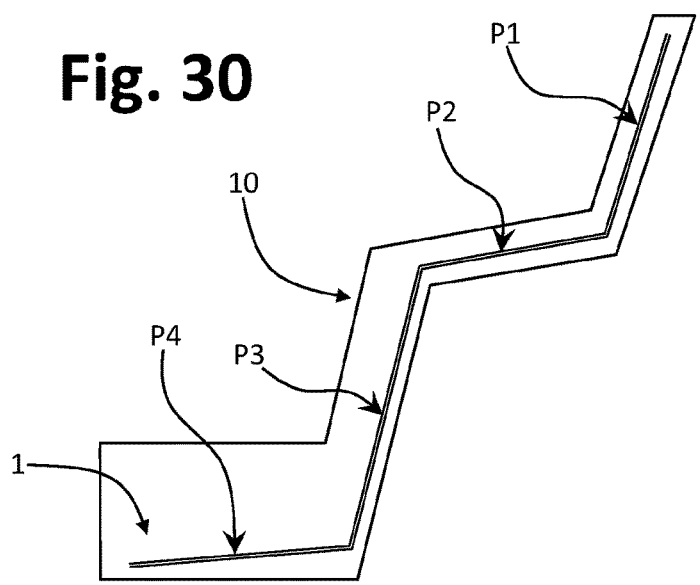
FIG. 30 is a schematic cross-sectional representation of a possible configuration of installation of a level-sensor device according to possible embodiments of the invention.

For a better understanding of this aspect, reference may be made to the cross-sectional view of FIG. 30, which represents schematically a tank 10 having a complex geometrical shape set in which is a level sensor 1 according to the invention, having a plurality of consecutive areas P1-P4, which extend in respective planes generally at angles with respect to one another, and where each area includes one or more detection sections with respective pairs of electrodes having different geometries.

For example, the area P4, furthest away from the control electronics, requires high measurement resolutions but, being very inclined with respect to the vertical, the electrodes of the corresponding detection section, or sections, can use pairs of electrodes with relatively large detection parts J, for example of the type shown in FIG. 8 (this because, with a high inclination, 1 mm in height is equivalent to many millimetres in width).

In the next area P3, a high measurement resolution is in any case required, but given the low inclination with respect to the vertical it is sufficient to use electrodes with relatively small detection parts J, for example of the type shown in FIGS. 1 and 2a. For the next areas P2 and P1 there basically apply the same considerations expressed for the areas P4 and P3, respectively.

Figure 31:
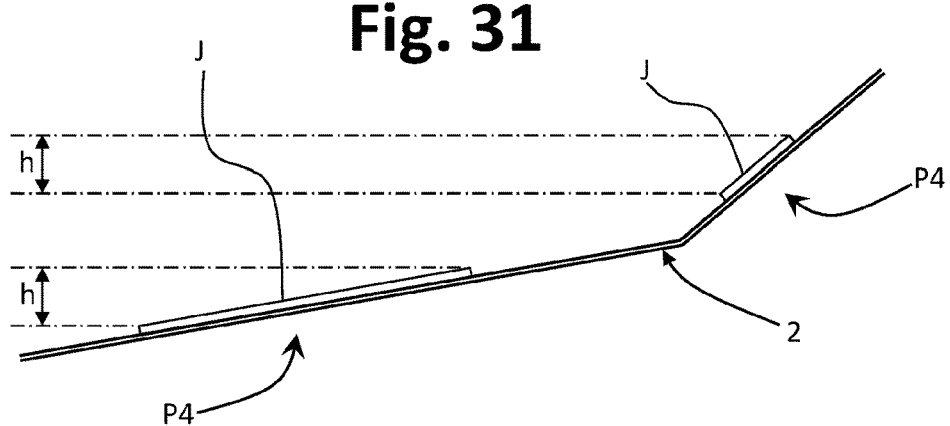
FIG. 31 is a partial and schematic representation of a possible configuration of installation of a level-sensor device according to possible embodiments of the invention.

As has been said, the measurement resolution depends, not only upon the surface dimensions of the detection parts of the electrodes J, but also upon the inclination of the detection elements J with respect to the vertical direction. The concept is exemplified in FIG. 31, where the elements J in the area designated by S4 are arranged with a high inclination to the point of having the same resolution as that of the elements J of the area P2, which is less inclined with respect to the vertical.

On the basis of what has been explained previously it is also possible to choose, via software programming of the control electronics, different types of compensation according to the characteristics of the detection area P1-P4, for example with a single reference electrode (as in FIGS. 10-11), or else with a number of reference electrodes in various positions (as in FIG. 12), to minimize the effects of the temperature gradient and of the variations linked to the quality of the liquid and to the fact that it can stratify or present characteristics or temperatures different in the various areas of the tank.

The level sensor 1 according to the invention comprises, or is associated or can be associated to, one or more elements for positioning and/or fixing at least one aforesaid supporting structure in/to a container or tank. The aforesaid positioning and/or fixing elements may be integrated in the level sensor or mounted thereon. The sensor 1 may be provided with the above elements already mounted thereon, or else be prearranged for installation via the above elements, which could be provided in the form of kit together with the sensor.

In various embodiments, the level sensor 1 comprises, or is associated to, a plurality of positioning and/or fixing elements, which are spaced apart from one another in the direction of length of the sensor and are configured for keeping in position the at least one supporting structure, for example with respect to at least one wall of a container or tank.

FIGS. 32-44 exemplify various possible embodiments of positioning and/or fixing elements B, which can be used for securing in position the sensor 1, i.e., its supporting structure 2, at at least one wall of the container or tank 10.

Figure 32:
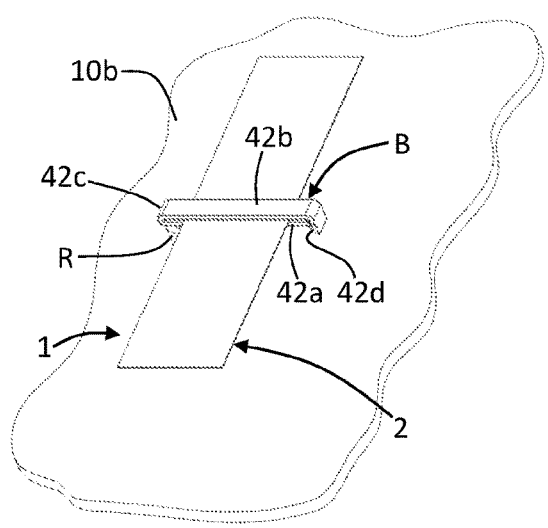
Figure 33:
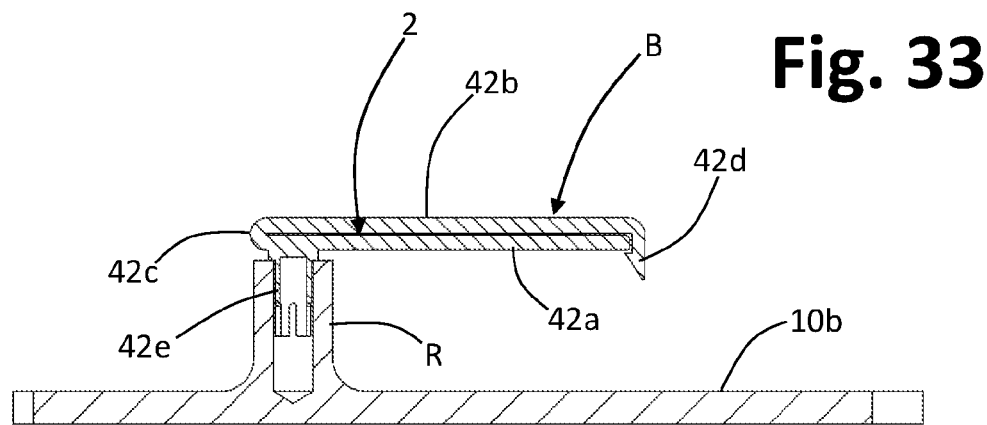

FIGS. 32-33 illustrate the case of a positioning and/or fixing element, the body of which is designed to extend in a direction transverse to the electrodes of a detection structure and which includes two portions that can be closed by snap action, with respective stretches of the electrodes set in between. The aforesaid body may be conveniently made of a suitable plastic material, for example via moulding. In the example, the element B hence envisages two elongated portions 42a and 42b joined together by a hinge portion 42c, where, at the end of the portion 42b opposite to the hinge portion 42c, a hooking element 42d may be provided, for example in the form of an elastic tooth, to secure the two parts 42a and 42b firmly together.

The lower portion of the element 4, here the portion 42a, is provided with a part 42e for fixing, for example via snap action, or in a threaded way, or with interference, to a corresponding support R defined in a wall of the container containing the liquid the level of which is to be detected, for example a bottom wall 10b.

Figure 34:
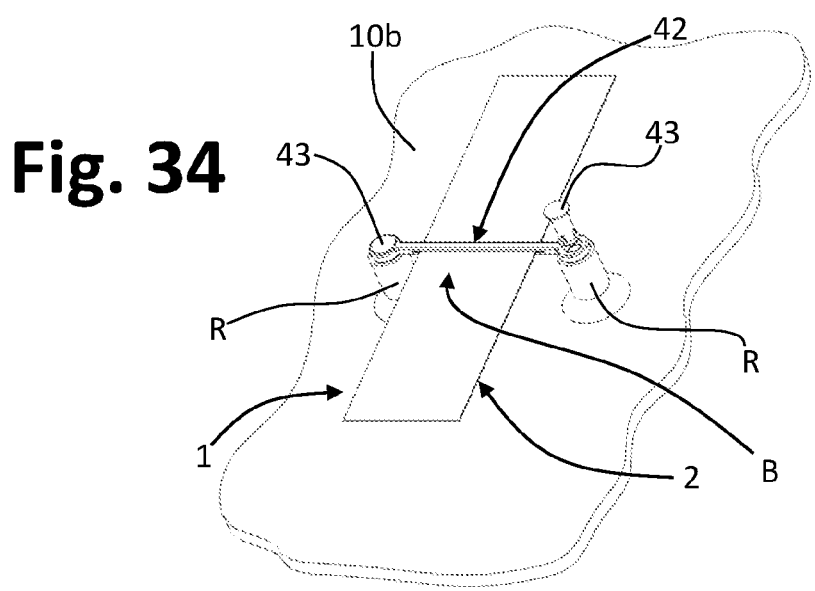
Figure 35:
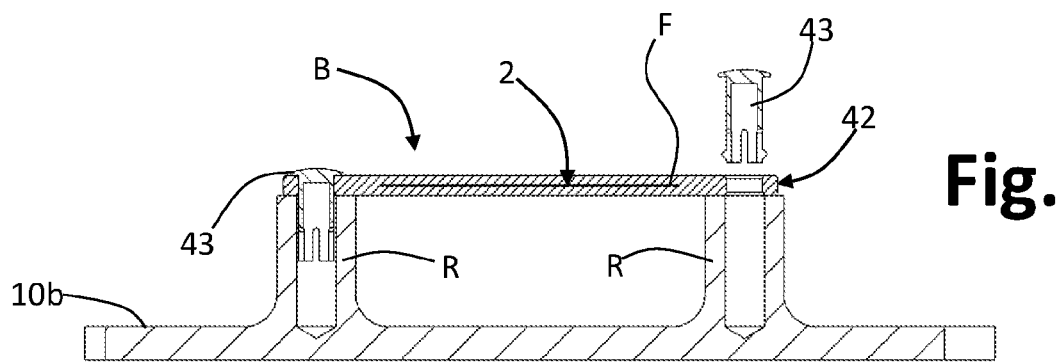
Figure 36:
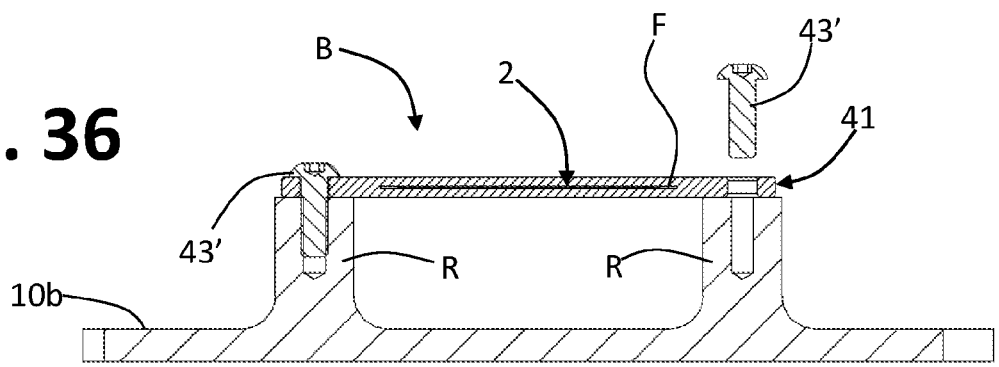

FIGS. 34-36 regard an element B, the body 42 of which has a slit F in which a stretch of the supporting structure 2 can be received and which defines, at its two ends, through seats (not indicated) for corresponding members for fixing to two supports R. In the example of FIGS. 34-35 the aforesaid fixing members, designated by 43, engage in a snap-action way or with interference, whereas in the case of FIG. 36 threaded members or rivets 43' are provided.

Figure 37:
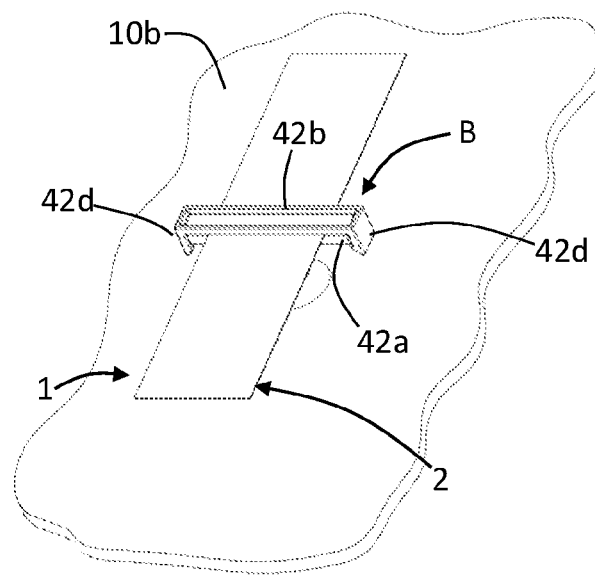
Figure 38:
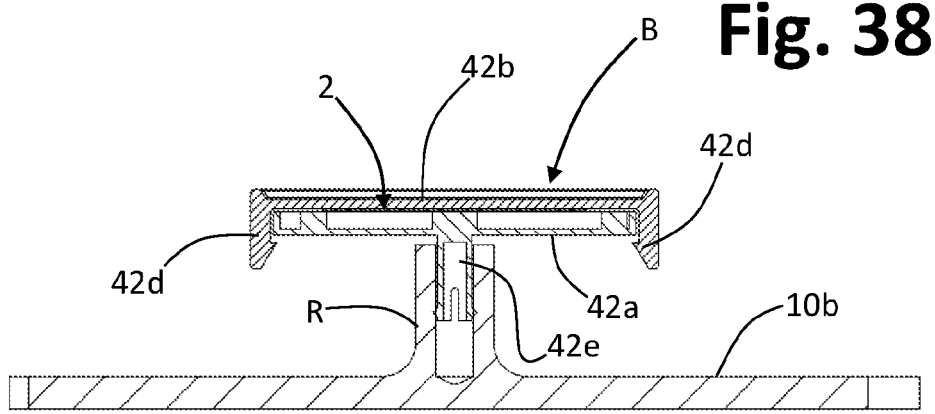

FIGS. 37-38 regard a version of positioning element similar to that of FIGS. 32-33, in which, however, the two body portions 42a and 42b are configured as distinct parts. In this case, one of the two portions—here the portion 42b—has at its two opposite ends respective hooks 42d, for example in the form of elastic teeth, for blocking the portion 42b on the portion 42a, with a respective stretch of the structure 2 set in between. Also in this case, the portion 42a is provided with a part 42e for fixing, for example via snap action, or by threaded connection, or with interference, to a corresponding support R.

Figure 39:
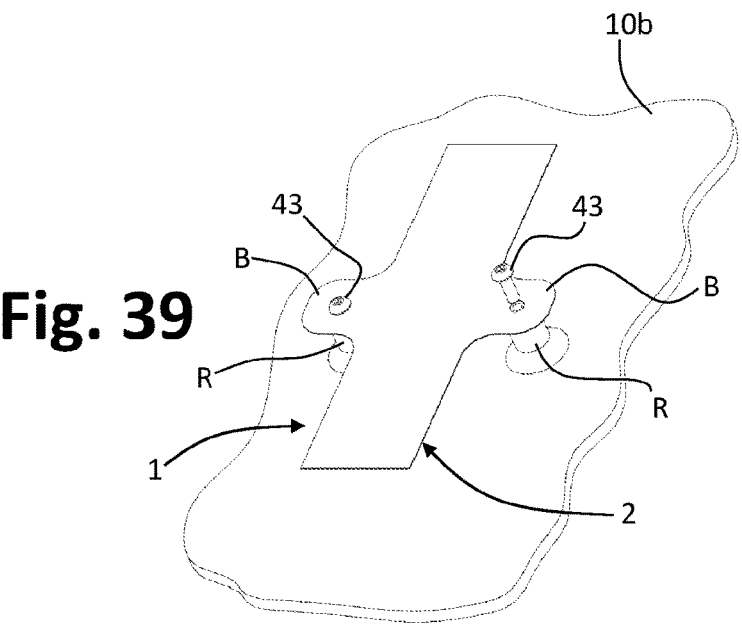
Figure 40:
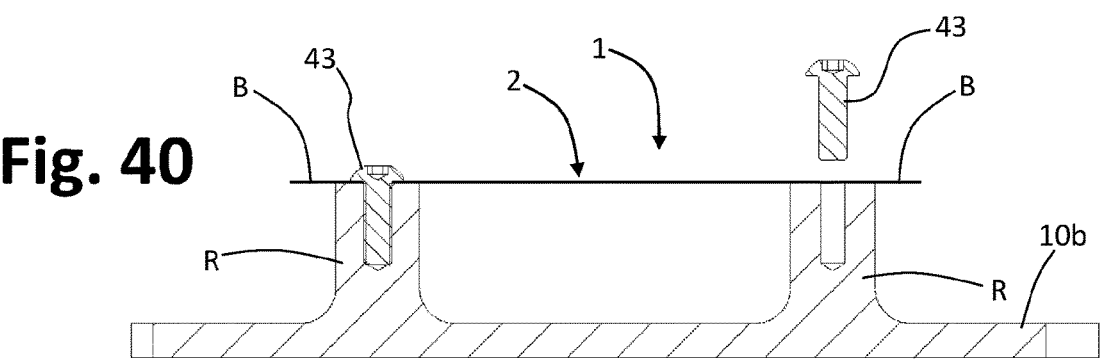
Figure 41:
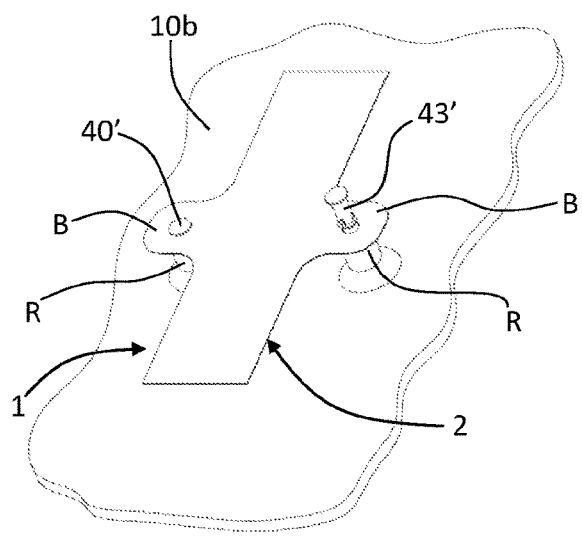
Figure 45:
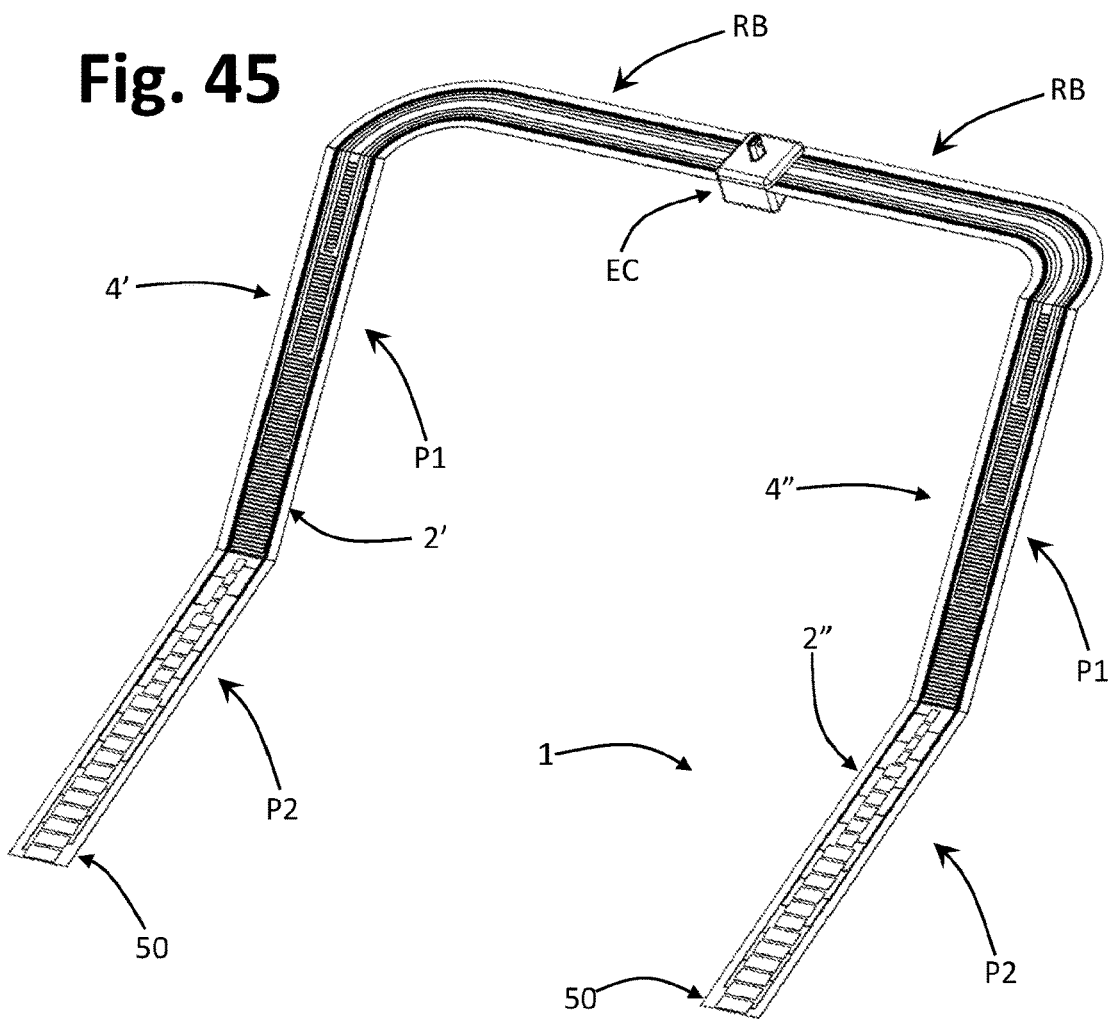
FIG. 45 is a schematic perspective view of a level sensor according to further possible embodiments of the invention.
Figure 46:
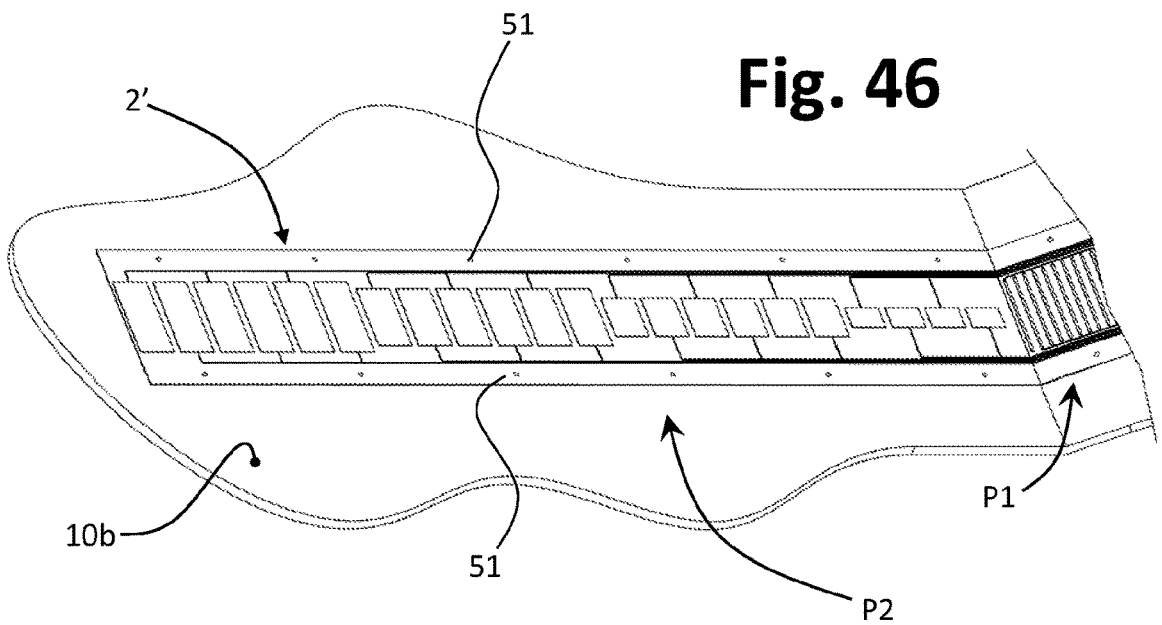
FIG. 46 is a partial and schematic perspective view of a portion of a sensor of the type shown in FIG. 45 associated to a wall of a generic container.
Figure 47:
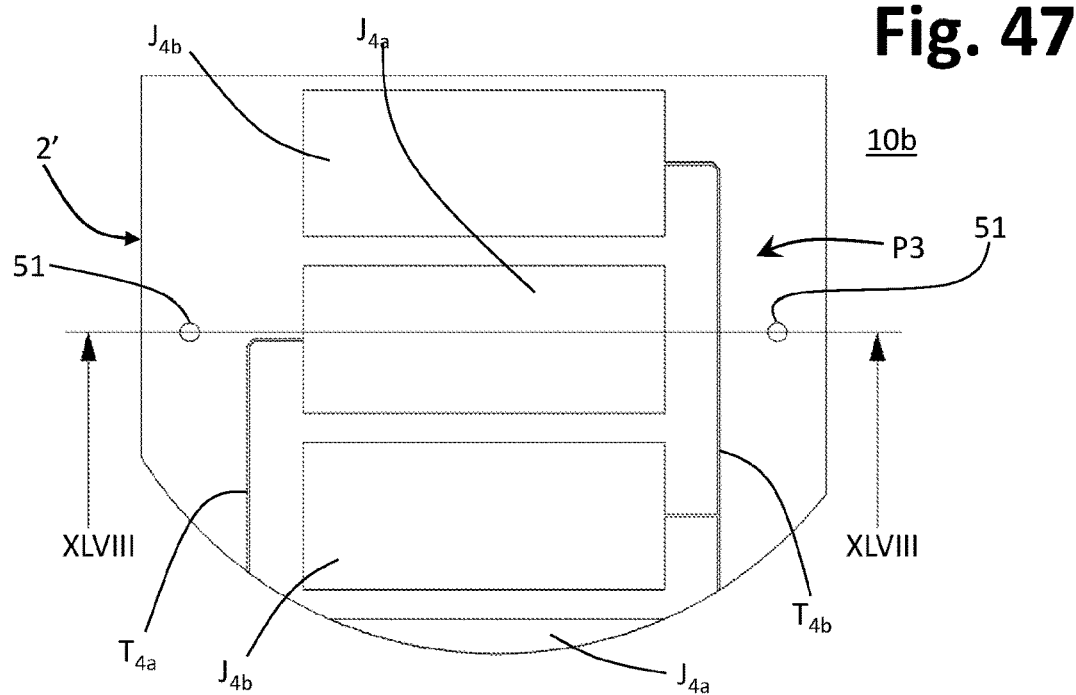
FIG. 47 is a schematic top plan view of a part of the portion of sensor of FIG. 45.
Figure 48:
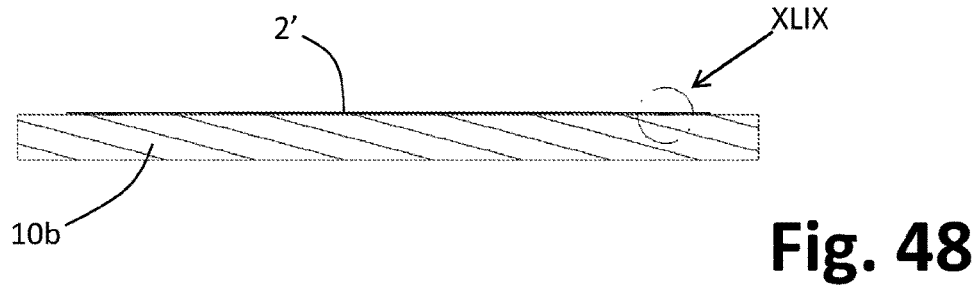
FIG. 48 is a schematic cross-sectional view according to the line XLVIII-XLVIII of FIG. 47.
Figure 49:
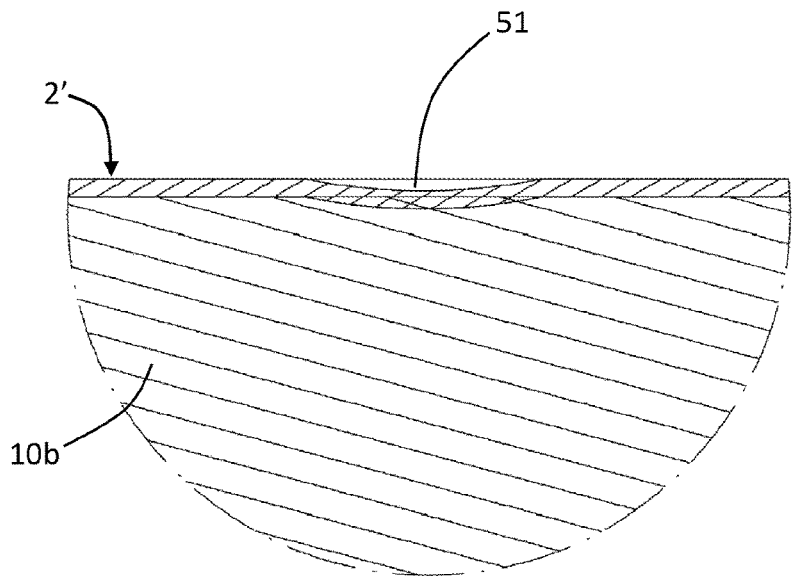
FIG. 49 illustrates the detail XLIX of FIG. 48 at a larger scale.
Figure 50:
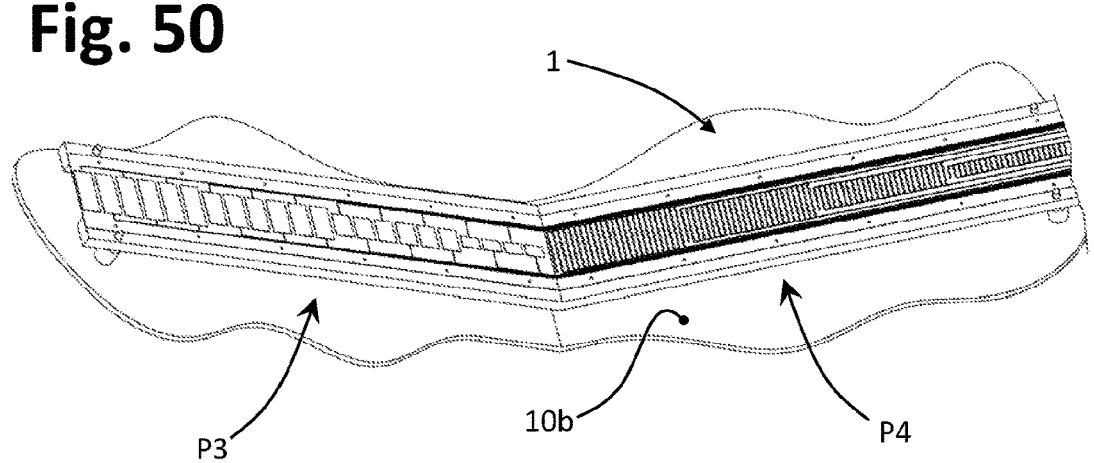
FIG. 50 is a partial and schematic perspective view of a portion of a sensor according to further possible embodiments of the invention, associated to a wall of a generic container.
Figure 51:
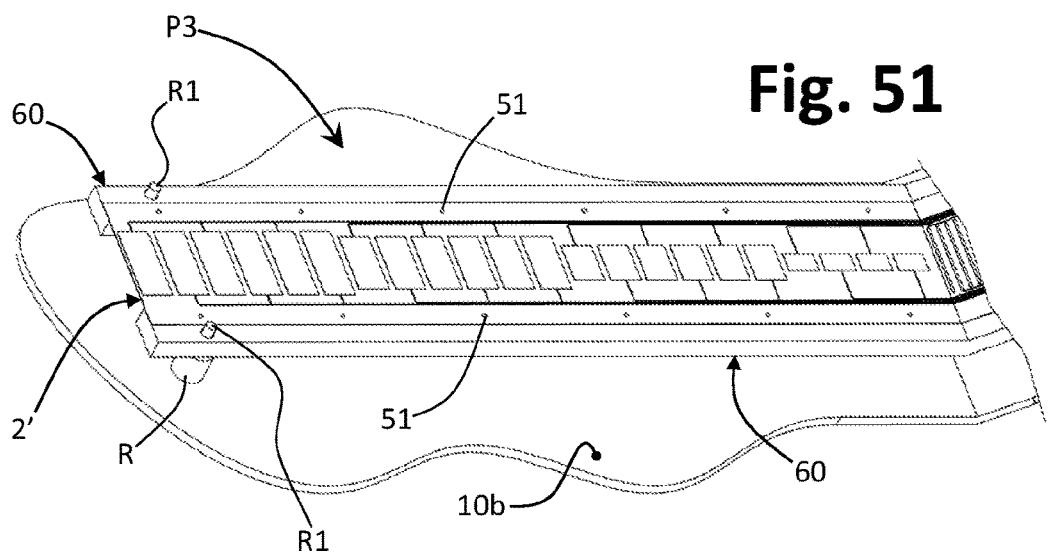
FIG. 51 is a detail at a larger scale of the portion of sensor of FIG. 50.
Figure 52:
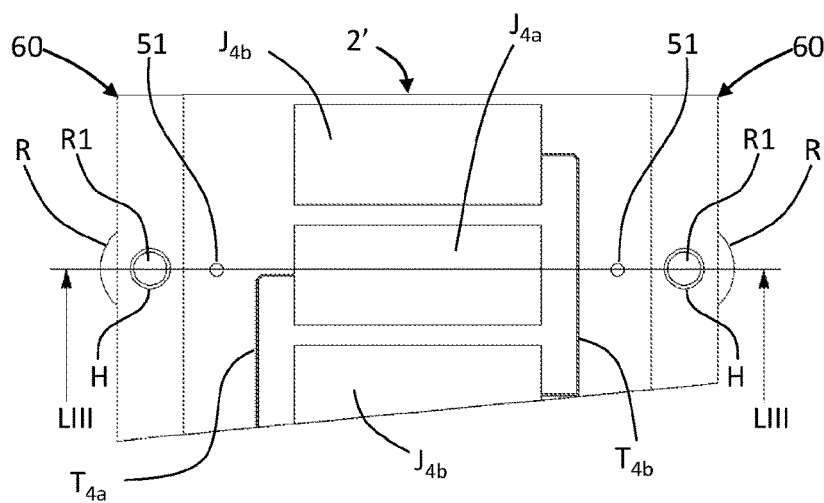
FIG. 52 is a schematic top plan view of a part of the portion of sensor of FIG. 51.
Figure 53:
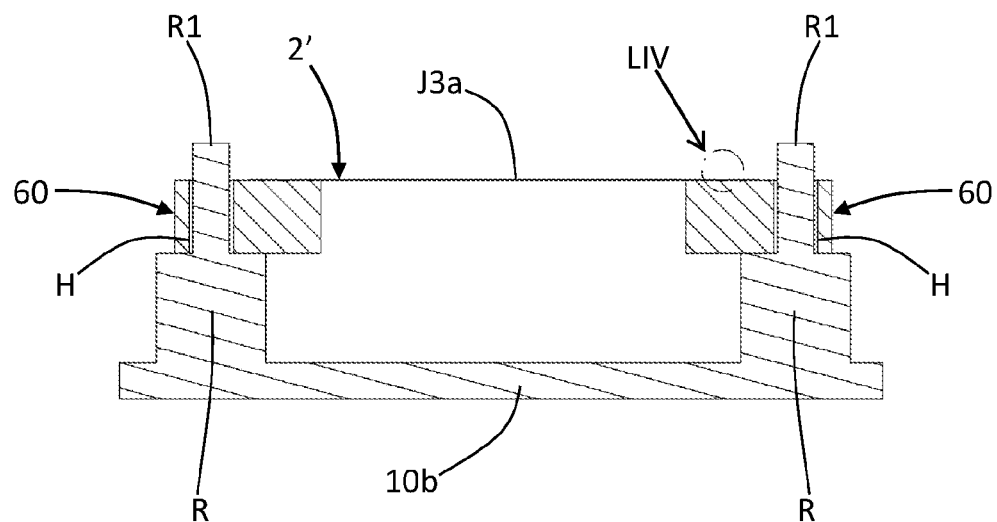
FIG. 53 is a schematic cross-sectional view according to the line LIII-LIII of FIG. 52.
Figure 54:
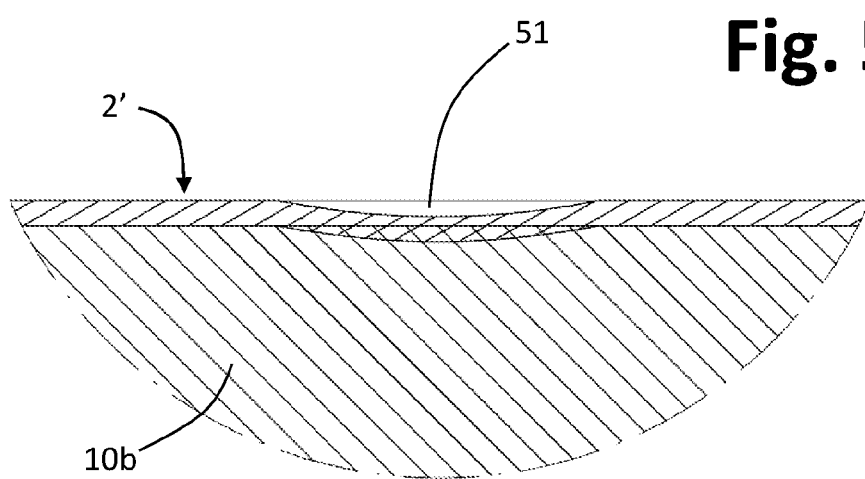
FIG. 54 illustrates at a larger scale the detail LIV of FIG. 53.

FIGS. 39-42 illustrate a solution of positioning elements B that are defined directly by the supporting structure 2, in the form of projecting appendages or brackets, provided with through holes for fixing members 43 secured to the supports R, for example interference-engagement members, or threaded members, or rivets, as in FIGS. 39-40, or else by means of snap-action engagement members 43', as in FIGS. 41-42.

FIGS. 43-44 illustrate a similar case, in which, however, the supports R define respective upper ends R1 that can be received through the holes of the projecting appendages or brackets that provide the elements B, with these ends that can then be upset or bucked, for example by hot-forming, to provide a widened fixing portion, such as the one designated by Ra'.

Of course, the positioning and/or fixing members B of the supporting structure 2 or structures 2', 2" of a level sensor 1 according to the invention do not necessarily have all to be the same as one another, it being possible to envisage, for example, the combined use of different elements B according to FIGS. 32-44.

The supporting structure (2; 2a; 2', 2") of a level sensor 1 may be made of polymer or comprise a polymer substrate, for example made of HDPE or other material, preferably a material similar to or designed to fix or bind chemically to the material of the container or tank 10. According to possible embodiments, the supporting structure may be welded directly on the container or tank (typically made of HDPE), via welding spot obtained by re-melting and co-penetration of the two materials, for example by means of ultrasound welding or a heated tool. Instead of being a spot weld, the weld may be in the form of a bead.

An example of this type is shown in FIGS. 45-49, where the supporting structure 2' and/or 2" of the sensor 1 is fixed via welding spots 51 directly on the wall 10b of the container 10. As has been said, according to possible variants, the supporting structure 2, 2' or 2", i.e., one of its sheets or layers 2a, can be associated to a corresponding polymer substrate, for example glued thereon, and the substrate is then welded on the container, for example in way similar to what has been described just above.

According to other possible embodiments, the supporting structure (2; 2a; 2', 2") of a level sensor according to the invention is welded to a frame, for example in the form of two lateral straps. The frame may be made, for example, of HDPE or some other material, preferably similar or designed to fix or bind chemically to the material of the container. The aforesaid frame may in turn be fixed or welded on the container, for example via holes in the aforesaid frame, engaging in which are purposely provided reliefs of the container.

Such a case is exemplified in FIGS. 50-54, where the polymer supporting structure 2' is welded on the aforesaid frame, designated by 60. In various embodiments, such as the one exemplified, the frame 60 comprises two parallel straps provided with holes H, engaged in which are corresponding ends R1 of supports R provided on a wall 10b of the container 10. The supporting structure 2' of the sensor may be welded to the aforesaid frame 60 (preferably designed to stiffen at least in part the structure 2' itself, in particular for more convenient handling), for example via welding spots 51 obtained by re-melting and co-penetration of the two materials, i.e., the material of the structure 2' and the material of the frame 60. As an alternative to coupling with holes H and supports R, the frame 60 could be itself welded to the container 10.

Also in this case, in possible variant embodiments, the structure 2' could be associated, for example glued, to a corresponding substrate made of polymer (for example, HDPE), which is then welded to the frame 60, with the latter that in turn can be fixed or welded on the container, for example as described just above.

From the foregoing description, the characteristics of the present invention emerge clearly, as likewise do its advantages.

It is clear that numerous variations may be made by the person skilled in the branch to the level sensor described by way of example, without thereby departing from the scope of the invention as defined in the ensuing claims.

The invention has been described with particular reference to detection of the level and/or other characteristics of a liquid medium, but, as mentioned, the sensor described may be used in combination with different substances and materials, even ones that may potentially undergo solidification, for example on account of freezing. Individual characteristics described with reference to embodiments disclosed previously may be combined together in other embodiments.

The invention claimed is:

1. A capacitive sensor for detecting the level of a medium, in particular a liquid medium, which comprises at least one control circuit, a supporting structure which extends in a length direction and has a proximal end region and a distal end region, and at least one detection structure on the at least one supporting structure,
wherein the at least one detection structure comprises a plurality of electrodes each including a connection part which extends substantially in the length direction, and a plurality of detection parts, which are connected to the connection part and which extend in a direction transverse to the length direction with a respective width dimension, the detection parts of a first electrode being arranged in a substantially interdigitated configuration with respect to the detection parts of a second electrode,
and wherein:
the at least one detection structure includes a plurality of first detection sections which extend in succession in the length direction, the plurality of first detection sections including at least one upper section, closest to the proximal end region, and one or more underlying sections, amongst which at least one lower section closest to the distal end region, the detection parts of each of the first and second electrodes being at the corresponding first detection section,
each first detection section includes one said first electrode and one said second electrode, the first and second electrodes of each first detection section being set on the at least one supporting structure electrically insulated from one another and with respect to the first and second electrodes of each of the other first detection sections,
the control circuit is prearranged for selectively applying an electrical potential difference between the first and second electrodes of a corresponding detection section, detecting a value of electrical capacitance between them, and determining, on the basis of said value of electrical capacitance, the level of the medium,
each first detection section being thereby usable for carrying out detections of electrical capacitance in a way independent of the other first detection sections.

2. The capacitive sensor according to claim 1, wherein the detection parts of each of the first and second electrodes of a first detection section have width dimensions different from the width dimensions of the detection parts of each of the first and second electrodes of an adjacent first detection section.

3. The capacitive sensor according to claim 1, wherein the supporting structure is a supporting structure that is substantially flexible, or deformable, or conformable, or adaptable.

4. The capacitive sensor according to claim 1, comprising at least one of the following:
at least one reference electrode,
at least one temperature-sensor element,
a plurality of positioning and/or fixing elements, which are spaced apart from one another in the length direction,
an electrical-connection structure on the at least one supporting structure.

5. The capacitive sensor according to claim 1, wherein the control circuit is moreover prearranged for determining, on the basis of said value of electrical capacitance, at least one qualitative characteristic of the medium.

6. A method for detecting at least one of a level and a qualitative characteristic of a medium in a container or a tank, comprising providing a capacitive sensor according to claim 1.

7. The capacitive sensor according to claim 1, wherein the detection parts are equidistant from one another.

8. The capacitive sensor according to claim 1, wherein the connection part of each of the first and second electrodes of each detection section extends on the at least one supporting structure starting from said proximal end region, with at least one effective portion of the connection part of at least one of the first and second electrodes of at least one first detection section that extends on the at least one supporting structure in a position generally set alongside at least one non-effective portion of the connection part of at least one of the first and second electrodes of at least one adjacent first detection section.

9. The capacitive sensor according to claim 8, wherein a distance between each detection part of one of the first and second electrodes of a first detection section and the effective portion of the corresponding connection part of the other of the first and second electrodes is smaller than a distance between said effective portion and said at least one non-effective portion.

10. The capacitive sensor according to claim 1,
wherein the at least one detection structure has a plurality of areas which extend in respective planes generally set at angles with respect to one another.

11. The capacitive sensor according to claim 10, wherein the at least one supporting structure has respective bends or curves at each region of transition between two said consecutive areas.

12. The capacitive sensor according to claim 1, wherein the at least one detection structure comprises at least one first detection structure and one second detection structure.

13. The capacitive sensor according to claim 12, wherein the first detection structure and the second detection structure extend in positions generally set side by side.

14. A container or tank for a liquid substance, comprising a capacitive sensor according to claim 1.

15. The container or tank according to claim 14, defining at least two areas for accumulation of the medium in positions generally set side by side, wherein the capacitive sensor comprises two said detection structures, which each extend at least in part in a respective said area for accumulation of the medium.

16. The container or tank according to claim 14, wherein the container or tank is a vehicle tank.

17. The container or tank according to claim 14, wherein the container or tank is a saddle tank.

18. The container or tank according to claim 14, having within it a plurality of supporting elements for fixing in position at least one said supporting structure, the supporting elements being spaced apart from one another in the length direction.

19. The container or tank according to claim 18, wherein the supporting elements are configured for coupling with respective positioning and/or fixing elements of the capacitive sensor.

20. A capacitive sensor for detecting at least one of a level and a characteristic or quality of a medium, in particular a liquid medium, which comprises at least one control circuit, a supporting structure which extends in a length direction and has a proximal end region and a distal end region, and at least one detection structure on the at least one supporting structure, wherein the at least one detection structure comprises a plurality of electrodes, which each include a connection part which extends substantially in the length direction, and a plurality of detection parts which are connected to the connection part and extend in a direction transverse to the length direction with a respective width dimension, the detection parts of a first electrode being arranged in a substantially interdigitated configuration with respect to the detection parts of a second electrode, and wherein:

the at least one detection structure includes a plurality of first detection sections which extend in succession in the length direction, the plurality of first detection sections including at least one upper section, closest to the proximal end region, and one or more underlying sections, amongst which at least one lower section closest to the distal end region;

the control circuit is prearranged for selectively applying an electrical potential difference between the first and second electrodes of a corresponding detection section, detecting a value of electrical capacitance therebetween, and determining, on the basis of said value of electrical capacitance, at least one of the level and a characteristic or quality of the medium.

\* \* \* \* \*